United States Patent [19]
White et al.

[11] Patent Number: 6,034,689
[45] Date of Patent: Mar. 7, 2000

[54] WEB BROWSER ALLOWING NAVIGATION BETWEEN HYPERTEXT OBJECTS USING REMOTE CONTROL

[75] Inventors: Christopher M. White, San Francisco; Phillip Y. Goldman, Los Altos; David R. Anderson, Cupertino; Keith R. Ohlfs, San Jose; Bruce A. Leak, Palo Alto, all of Calif.

[73] Assignee: WebTV Networks, Inc., Mountain View, Calif.

[21] Appl. No.: 08/660,088

[22] Filed: Jun. 3, 1996

[51] Int. Cl.[7] .................................................... G06F 17/30
[52] U.S. Cl. .......................................... 345/357; 345/327
[58] Field of Search .................................. 345/357, 356, 345/355, 327, 328, 326, 329, 330–339, 340–354; 707/151, 11

[56] References Cited

U.S. PATENT DOCUMENTS

| | | | |
|---|---|---|---|
| 4,575,579 | 3/1986 | Simon et al. ................................. | 178/4 |
| 4,852,151 | 7/1989 | Dittakavi et al. .......................... | 379/97 |
| 4,922,523 | 5/1990 | Hashimoto ................................. | 379/96 |
| 4,975,944 | 12/1990 | Cho .......................................... | 379/209 |
| 4,995,074 | 2/1991 | Goldman et al. .......................... | 379/97 |
| 5,005,011 | 4/1991 | Perlman et al. ........................... | 340/728 |
| 5,095,494 | 3/1992 | Takahashi et al. ......................... | 375/10 |
| 5,220,420 | 6/1993 | Hoarty et al. .............................. | 358/86 |
| 5,241,587 | 8/1993 | Horton et al. ............................. | 379/93 |
| 5,263,084 | 11/1993 | Chaput et al. ............................ | 379/215 |
| 5,287,401 | 2/1994 | Lin ............................................ | 379/98 |
| 5,299,307 | 3/1994 | Young ....................................... | 395/161 |
| 5,325,423 | 6/1994 | Lewis ........................................ | 379/90 |
| 5,341,293 | 8/1994 | Vertelney et al. .................. | 364/419.17 |
| 5,369,688 | 11/1994 | Tsukamoto et al. ..................... | 379/100 |
| 5,410,541 | 4/1995 | Hotto ........................................ | 370/76 |
| 5,425,092 | 6/1995 | Quirk ........................................ | 379/215 |
| 5,469,540 | 11/1995 | Powers, III et al. ..................... | 395/158 |
| 5,488,411 | 1/1996 | Lewis ........................................ | 348/8 |
| 5,490,208 | 2/1996 | Remillard ................................. | 379/96 |
| 5,530,852 | 6/1996 | Meske, Jr. et al. ...................... | 395/600 |
| 5,538,255 | 7/1996 | Barker ...................................... | 463/41 |
| 5,558,339 | 9/1996 | Perlman .................................... | 463/42 |
| 5,561,709 | 10/1996 | Remillard ................................. | 379/96 |
| 5,564,001 | 10/1996 | Lewis ........................................ | 395/154 |
| 5,586,257 | 12/1996 | Perlman .................................... | 463/42 |
| 5,612,730 | 3/1997 | Lewis ........................................ | 348/8 |
| 5,701,451 | 12/1997 | Rogers et al. ........................... | 395/600 |
| 5,706,502 | 1/1998 | Foley et al. .............................. | 395/610 |
| 5,710,918 | 1/1998 | Lagarde et al. .......................... | 395/610 |
| 5,717,860 | 2/1998 | Eraber et al. ....................... | 395/200.12 |

OTHER PUBLICATIONS

Matt Rosoff, Review: "Gateway Destination PC," c/net inc., 2 pages, Feb. 19, 1996.

Robert Seidman, Article: What Larry and Lou Know (That You Don't), c/net inc., 2 pages, Jan. 29, 1996.

Susan Stellin, Article: "The $500 Web Box: Less is More?" c/net inc., 2 pages, 1996.

*Primary Examiner*—Steven Sax
*Attorney, Agent, or Firm*—Workman, Nydegger, Seeley

[57] ABSTRACT

Browser software implemented in a set-top box as part of a client system communicating over the Internet with one or more servers allows a user to navigate using a remote control through World-Wide Web pages in which a plurality of hypertext anchors are displayed on a television. A user input entered from a remote input device is received by the client system over an infrared (IR) link. The user input specifies a direction in which the user wishes to move a selection relative to a currently selected hypertext anchor. Based on the user input, a determination is made of which one of the hypertext anchors is a best selectable hypertext anchor, and that hypertext anchor is then selected and indicated as such to the user. The user interface allows for the selection of hypertext anchors which are part of either clientside or server-side image maps.

11 Claims, 18 Drawing Sheets

WEB BROWSER ALLOWING NAVIGATION BETWEEN HYPERTEXT OBJECTS USING REMOTE CONTROL

CROSS-REFERENCES TO RELATED APPLICATIONS

The present application is related to the following co-pending U.S. Patent applications:

U.S. Patent application entitled, "Method and Apparatus for Managing Communications Between a Client and a Server in a Network," having application No. 08/660,087, and filed on Jun. 3, 1996.

U.S. Patent application entitled, "Method and Apparatus for Providing Proxying and Transcoding of Documents in a Distributed Network," having application No. 08/656,924, and filed on Jun. 3, 1996.

U.S. Patent application entitled, "A Method and Apparatus for Using Network Address Information to Improve the Performance of Network Transactions," having application No. 08/656,923, and filed on Jun. 3, 1996 which are assigned to the assignee of the present invention.

FIELD OF THE INVENTION

The present invention pertains to the field of user interfaces for accessing remotely stored information over a network. More particularly, the present invention relates to a method and apparatus for navigating between hypertext objects displayed on a display device using a remote control.

BACKGROUND OF THE INVENTION

The number of homes and businesses using personal computers has increased substantially in recent years, and along with this increase has come an explosion in the use of the Internet, and particularly the World-Wide Web. The World-Wide Web is a collection of formatted hypertext pages located on numerous computers around the world that are logically connected by the Internet. Although "the Web" has in the past been a source of primarily scientific information, it is now a valuable resource for information relating to almost any subject, including business, entertainment, travel, and education, to name just a few. Advances in network technology, and especially in software such as "Web browsers" (software applications which provide a user interface to the Web), have made the Web accessible to a large segment of the population. However, despite the growth in the development and use of the Web, many people are still unable to take advantage of this important resource.

Access to the Web has thus far been limited to people who have access to a personal computer. Yet many people cannot afford the cost of even a relatively inexpensive personal computer, while others are unable or unwilling to learn the basic computer skills that are required to access the Web. Furthermore, Web browsers in the prior art generally do not provide the degree of user-friendliness desired by some people who lack computer experience, and many computer novices do not have the patience to learn how to use the software. Some people, for example, dislike an interface which requires them to identify hypertext objects and use the point-and-click technique to browse through Web pages.

Most people, however, feel quite comfortable using a remote control to operate a television set. Therefore, it would be desirable to provide a means by which a person can access the World-Wide Web without the use of a personal computer. In particular, it would be desirable for a person to be able to access and navigate through Web pages using an ordinary television set and a remote control. It would further be desirable to have a user interface by which a person can use a remote control to navigate between hypertext objects on a Web page with minimal effort or thought, so that a person feels more as if he or she is simply changing television channels rather than utilizing a complex computer network.

Prior art Web browsers also have certain limitations in the way they allow a user to move between Web sites. Browsing the Web can be thought of as moving forward and backward through various levels of a tree hierarchy. Each level in the tree represents a Web page. Since each Web page can have many hypertext links to other pages, a level in the tree can have many branches. Selecting a hypertext object, therefore, is analogous to moving down one level in the tree, whereas returning to the previous Web page is analogous to moving up one level in the tree. Prior art Web browsers generally provide a "Back" function for moving up one level to a previously visited Web page and a "Forward" function for moving down one level to a previously visited Web page. There is no ambiguity for the user when moving up a level in the tree, since there is always only one immediately prior Web page. However, there is often ambiguity when moving down one level to a previously visited level, since there may be many branches from the current level. This ambiguity can cause confusion to the user. Further, if the user wishes to return to where he was after having backed up by several levels, he generally must remember the sequence of hypertext objects he selected to get there and then retrace his steps exactly. Remembering this sequence can be an arduous task if the user has visited many Web pages. Therefore, it would be desirable to provide browsing functions such as "Back," "Forward," and others, in a manner which is more intuitive and which simplifies the user's task when browsing.

Another problem associated with the prior art is that, in some cases, images which are downloaded via a network connection are not appropriately sized for the display being used. One prior art solution for dealing with Web pages larger than the display is to allow horizontal and vertical scrolling. However, it has been found that horizontal scrolling can be confusing to many people. Therefore, it would be advantageous to provide a solution to displaying oversized image maps which eliminates the need for horizontal scrolling.

In addition, Web browsers in the prior art have various other disadvantages which are overcome by the present invention, as described in the detailed description which follows.

SUMMARY OF THE INVENTION

A method is described of allowing a user to navigate between a plurality of hypertext objects displayed on a display device in a client system in communication with one or more server systems. A plurality of hypertext objects are displayed on the display device, with each hypertext object representing information stored in one of the server systems. A user input entered from a remote input device is received by the client system. Based on the user input, a determination is made of which one of the hypertext objects is to be selected, and that hypertext object is then selected. A selection indicator is then displayed on the display device indicating to the user that the selected hypertext object has been selected.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus are described for allowing a user to navigate between a plurality of hypertext objects displayed on a display device using a remote input device. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

As will be described in greater detail below, the present invention includes steps for implementing a Web browser that allows a user to navigate through hypertext objects included in a World-Wide Web (hereinafter "Web") page using a remote control. The user is not required to identify or locate hypertext objects; rather, the system of the present invention performs this function for the user. In the preferred embodiment, the steps of the present invention are embodied in machine-executable instructions. The instructions can be used to cause a general-purpose or special-purpose processor which is programmed with the instructions to perform the steps of the present invention. Alternatively, the steps of the present invention might be performed by specific hardware components that contain hardwired logic for performing the steps, or by any combination of programmed computer components and custom hardware components.

The present invention is included in a system known as WebTV™, which uses a standard television set as a display device for browsing the Web and which connects to a conventional network, such as the Internet, using standard telephone, ISDN, or similar communication lines. In accordance with the present invention, a user of a WebTV™ client system can utilize WebTV™ network services provided by one or more remote WebTV™ servers. The WebTV™ network services can be used in conjunction with software running in a WebTV™ client system to browse the Web, send electronic mail, and to make use of the Internet in various other ways.

Figure 1A:
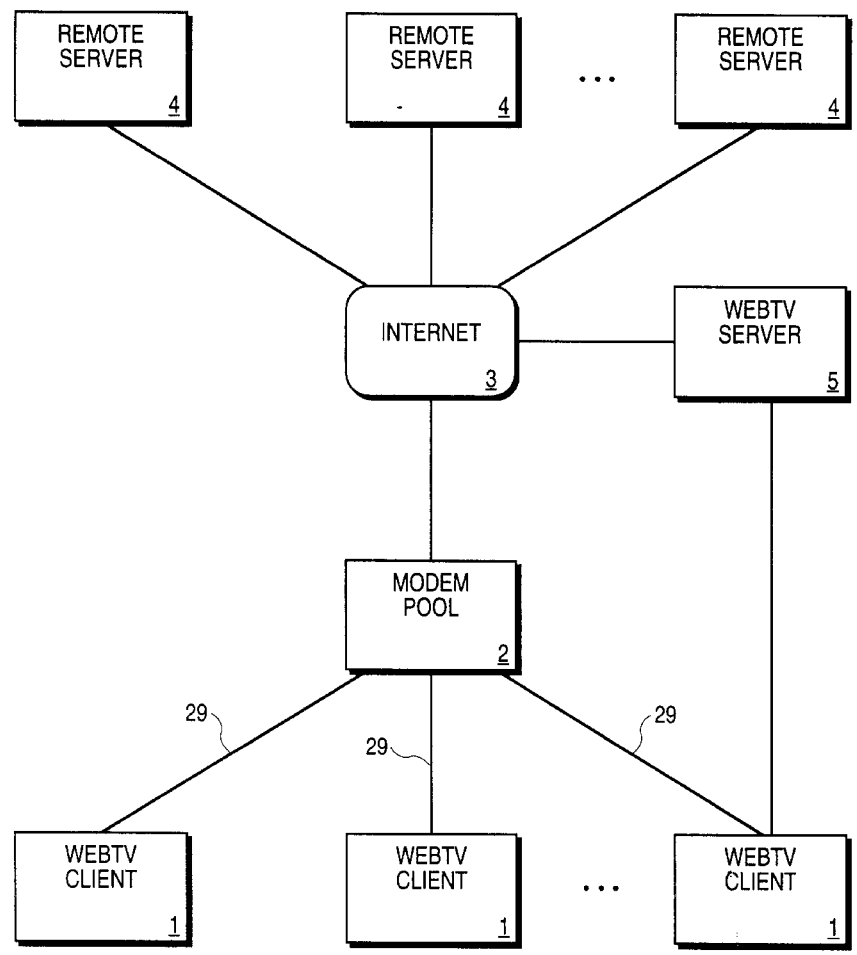
FIG. 1A illustrates several WebTV™ client systems connected to a WebTV™ server system.

FIG. 1A illustrates a basic configuration of the WebTV™ network according to one embodiment. A number of WebTV™ clients 1 are coupled to a modem pool 2 via direct-dial, bi-directional data connections 29, which may be telephone (POTS, i.e., "plain old telephone service"), ISDN (Integrated Services Digital Network), or any other similar type of connection. The modem pool 2 is coupled typically through a router, such as that conventionally known in the art, to a number of remote servers 4 via a conventional network infrastructure 3, such as the Internet. The WebTV™ system also includes a WebTV™ server 5, which specifically supports the WebTV™ clients 1. The WebTV™ clients 1 each have a connection to the WebTV™ server 5 either directly or through the modem pool 2 and the Internet 3. Note that the modem pool 2 is a conventional modem pool, such as those found today throughout the world providing access to the Internet and private networks.

Client System Architecture

Figure 1B:
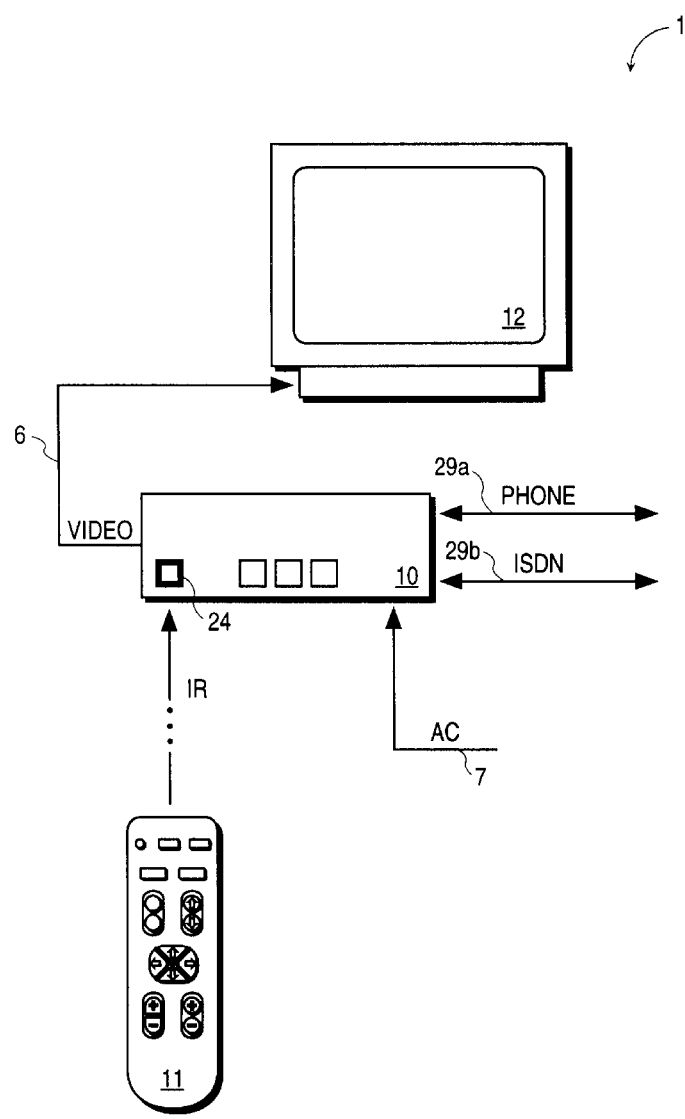
FIG. 1B illustrates a WebTV™ client system.

FIG. 1B illustrates a WebTV™ client 1. The WebTV™ client 1 includes an electronics unit 10 (hereinafter referred to as "the WebTV™ box 10"), an ordinary television set 12, and a remote control 11. In an alternative embodiment of the present invention, the WebTV™ box 10 is built into the television set 12 as an integral unit. The WebTV™ box 10 includes hardware and software for providing the user with a graphical user interface, by which the user can access the WebTV™ network services, browse the Web, send email, and otherwise access the Internet.

The WebTV™ client 1 uses the television set 12 as a display device. The WebTV™ box 10 is coupled to the television set 12 by a video link 6. The video link 6 is an RF (radio frequency), S-video, composite video, or other equivalent form of video link. The communication link 29 see, eg., FIGS 1A and 2B) between the WebTV™ box 10 and the server 5 is either a telephone (POTS) connection 29a or an ISDN connection 29b. The WebTV™ box 10 receives AC (alternating current) power through an AC power line 7.

Remote control 11 is operated by the user in order to control the WebTV™ client 1 in browsing the Web, sending e-mail, and performing other Internet-related functions. The WebT™ box 10 receives commands from remote control 11 via an infrared (IR) communication link. In alternative embodiments, the link between the remote control 11 and the WebT™ box 10 may be RF or any equivalent mode of transmission.

The WebTV™ box 10 includes application software which, when executed by a processor in the box 10, provides the user with a graphical user interface by which the user can access the WebTV™ network services and browse the Web. The application software is automatically executed upon application of power to the WebTV™ box 10.

Figure 1C:
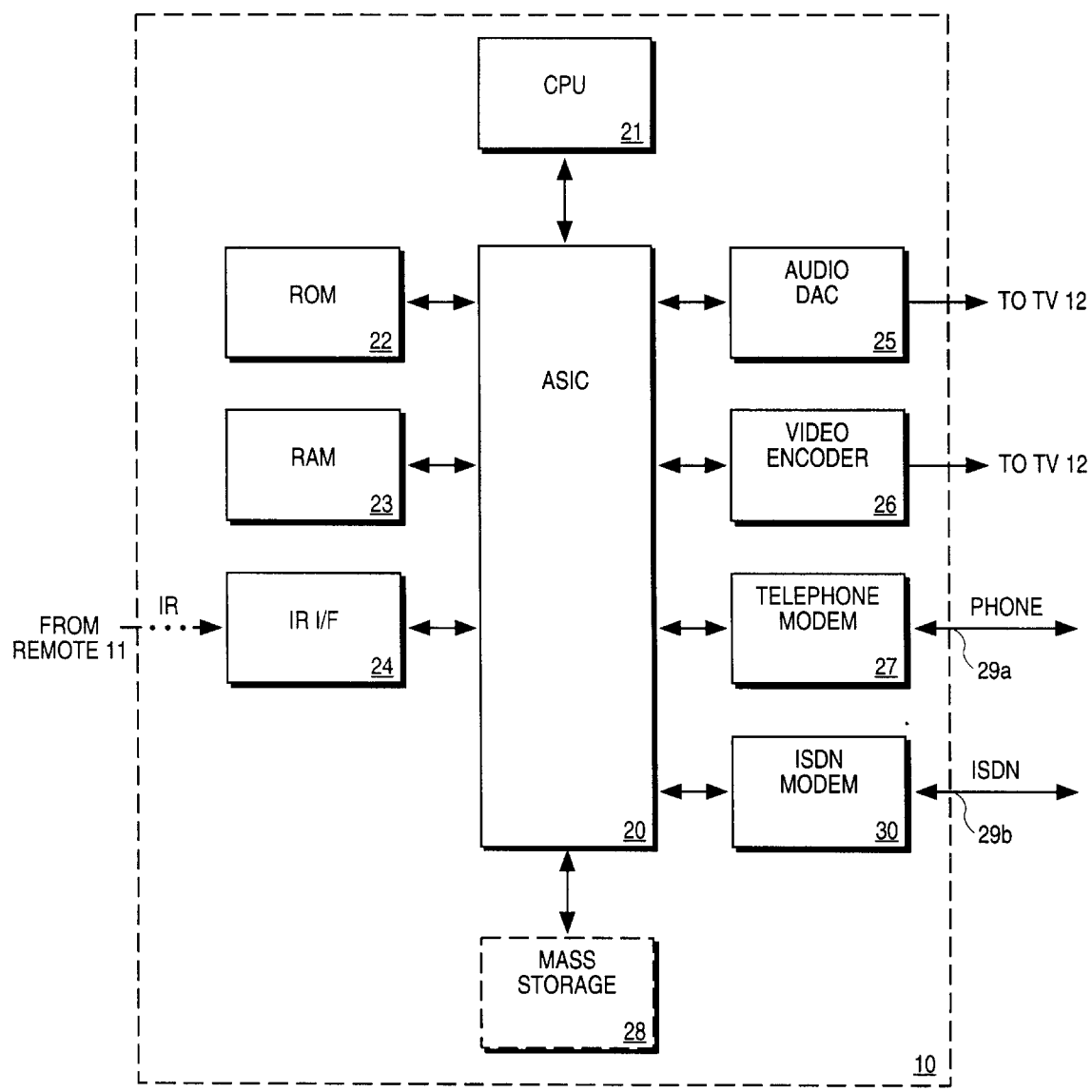
FIG. 1C is a block diagram of an electronics unit used to implement a Web browser that can be operated by remote control.

FIG. 1C is a block diagram of the internal features of the WebTV™ box 10. Operation of the WebTV™ client 1 is controlled by a central processing unit (CPU) 21 which is coupled to an Application-Specific Integrated Circuit (ASIC) 20. The CPU 21 executes software designed to implement features of the present invention. ASIC 20 contains circuitry which may be used to implement certain features provided by the WebTV™ client 1. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and an ISDN modem 30 are coupled to ASIC 20 to provide connections 29a and 29b, respectively, to the modem pool 2 and, via the Internet 3, to the remote servers 4. Note that the WebTV™ box 10 also may include a cable television modem (not shown).

Also coupled to ASIC 20 is Read-Only Memory (ROM) 22, which provides storage of program code for implementing the application software to be executed by the WebTV™ box 10. Note that ROM 22 may be a programmable ROM (PROM) or any form of erasable PROM (EPROM) or Flash memory. Also coupled to ASIC 20 is Random Access Memory (RAM) 23. A mass storage device 28 may optionally be provided and coupled to ASIC 20. The mass storage device 28 may be used to input software or data to the client or to download software of data received over network connection 29. The mass storage device 28 includes any suitable medium for storing machine-executable instructions, such as magnetic disks, optical disks, and the like.

Figure 2A:
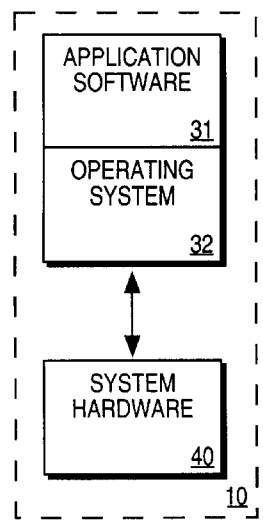
FIG. 2A illustrates the functional relationship between hardware and software in the client processing system of FIG. 1A.

As mentioned above, the WebTV™ box 10 includes application software including a Web browser. Referring now to FIG. 2A, the above-mentioned application software 31 operates in conjunction with operating system (OS) software 32. The OS software 32 includes various device drivers and otherwise provides an interface between the application software 31 and the system hardware components 40 (i.e., the elements illustrated in FIG. 1C).

In the preferred embodiment, the application software 31 and OS software 32 are stored in ROM 22. It will be recognized, however, that either or both of application software 31 and OS software 32 can be stored on any suitable storage medium, including magnetic or optical storage devices.

Figure 2B:
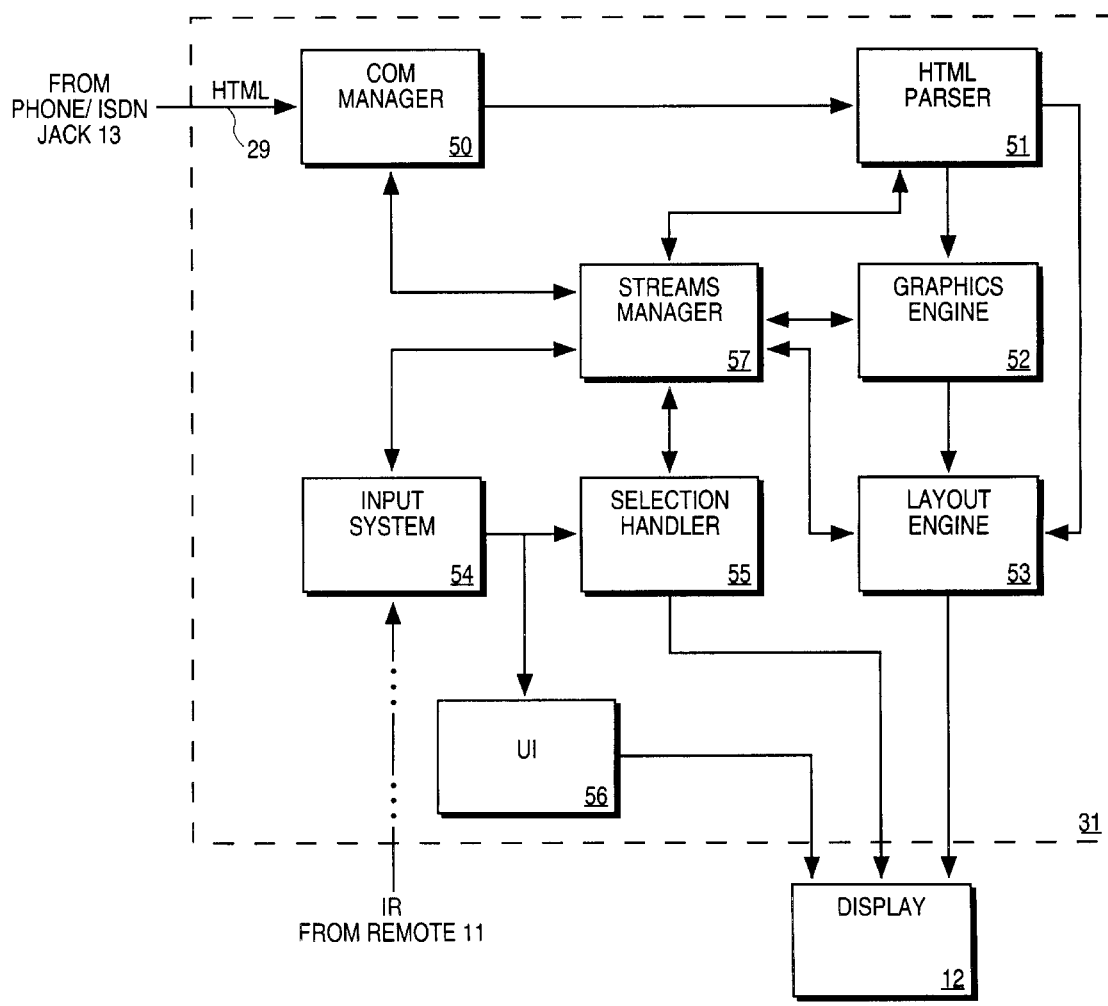
FIG. 2B is a block diagram of the Web browser application software of FIG. 2B.

The Web browser functions of the present invention are implemented by application software 31. FIG. 2B illustrates the functional relationships between the various components of application software 31. Application software 31 includes a communications manager 50, an HTML (Hypertext Markup Language) parser 51, a graphics engine 52, a layout engine 53, an input system 54, a user interface 56, a selection handler 55, and a streams manager 57. The client system receives Web pages over network connection 29 in the form of HTML documents. Streams manager 57 controls and coordinates movement of data throughout the system.

Each HTML document is initially input to communications manager 50. Communications manager 50 performs functions necessary to receive an HTML document, over the network connection 29 including handling highlevel communications protocols, such as HTTP (Hypertext Transport Protocol), TCP/IP (Transmission Control Protocol/Internet Protocol), etc. A received HTML document is provided by communications manager 50 to HTML parser 51. HTML parser 51 converts HTML page descriptions to a displayable format for the client system.

As is well known, an HTML document may contain text and/or refer to images. Further, an HTML document may include one or more "hypertext anchors," which are displayable objects that provide a link to another Web page. Hypertext anchors are also sometimes referred to as "hot links" or "hot spots." Each hypertext anchor is associated with a particular URL (Uniform Resource Locator) or other logical address representing the location of the Web page to which the anchor provides a link. The URL may or may not be stored within the client system, as will be discussed below. A hypertext anchor may be a word or a phrase of text, an image, or a part of an image. The hypertext anchors and other objects which are to be displayed on a screen are defined in the HTML document by a number of "tags" which specify information relating to the displayable object and its attributes (e.g., whether the object is a hypertext anchor, an image map, an image map containing hypertext anchors, etc.). Accordingly, HTML parser 51 separates tags from text within each HTML document under the control of the streams manager 57.

HTML parser 51 also generates a list of "displayables" (displayable objects) from the received HTML document. In addition, the HTML parser 51 generates a sorted list of "selectables" (selectable objects, i.e., displayable objects which are hypertext anchors). The method of generating this sorted list is discussed below in greater detail. The data structure containing the list of displayables is provided by HTML parser 51 to layout engine 53, which places the displayable objects on the screen of the television set 12. Image information, such as JPEG or GIF image information, are provided by HTML parser 51 to layout engine 53 via a graphics engine 52, which is responsible for measuring and drawing images.

In the course of browsing through a displayed Web page or between different Web pages, a user activates buttons on remote control 11, which, in response, transmits IR signals that are received by the WebTV™ box 10. Input system 54 records these inputs and provides them to selection handler 55 and user interface 56. In addition, input system 54 can handle input queuing and processing of inputs from various other input devices, such as a standard or IR keyboard. Selection handler 55 receives commands provided by the user for moving a selection (of a hypertext anchor) around on the screen (i.e., moving a selection from one hypertext anchor to another). The selection handler 55 determines, in response to the user inputs, which of the hypertext anchors in a Web page should be a current selection and provides a selection indication to the user of the current selection through the display of television set 12. Other aspects of the Web browser which are visible to the user are provided by user interface 56 based on signals received from input system 54.

Remote Control

Figure 3:
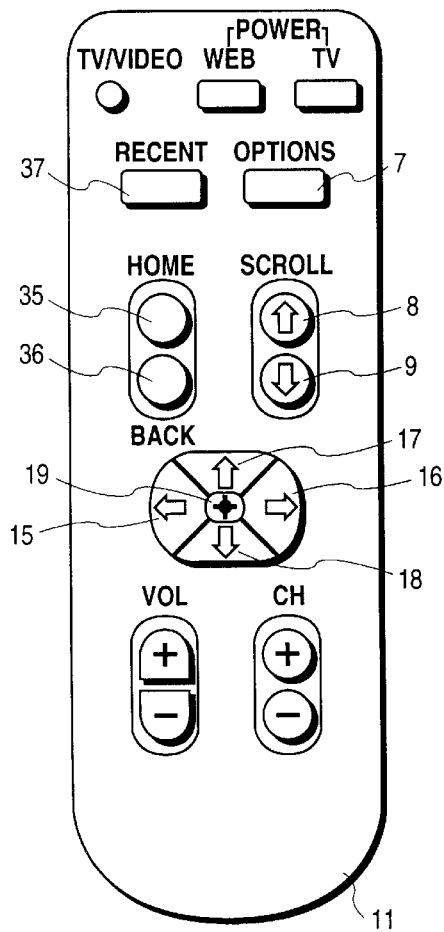
FIG. 3 illustrates a remote control for controlling the Web browser.

FIG. 3 illustrates remote control 11 in greater detail. In the preferred embodiment, remote control 11 is similar to and has the general appearance of a common, hand-held remote control that is used to control a television set. In fact, remote control 11 may include controls for performing any or all of the user-controlled functions of television set 12. In an alternative embodiment, remote control 11 may be a wired hand-held controller or a wired or wireless (e.g., IR) keyboard or any other similar device. Remote control 11 includes Options button 7, Scroll Up button 8, Scroll Down button 9, direction buttons 15–18, Enter button 19, Home button 35, Back button 36, and Recent button 37. Direction buttons 15-18 include left button 15, right button 16, up button 17, and down button 18.

The functions of the controls on remote control 11 will be described below in detail. However, a summary of certain ones of these functions is helpful at this point. Home button 35 causes the WebTV™ box 10 to directly access and display the Home page of the WebTV™ network services. Back button 36 allows the user to retrace his steps by revisiting previously-visited Web pages in reverse chronological order. Recent button 37 is used to access a display indicating the most recent Web sites (pages) the user has visited. From this display, the user will be allowed to directly revisit any of those sites. Scroll Up button 8 and Scroll Down button 9 are used to scroll the screen up or down, respectively, to display a previously undisplayed portion of a Web page. Direction buttons 15–18 allow the user to specify a direction of movement in order to select a new hypertext anchor. When Enter button 19 is pressed, remote control 11 sends a command to the WebTV™ box 10 to activate the hypertext link corresponding to the currently selected hypertext anchor. That is, in response to Enter button 19 being pressed, the uniform resource locator (URL) or other logical address of the currently selected hypertext object is transmitted by the WebTV™ box 10 over the network connection 29 (except in the case of certain image maps, as will be described below) in order to access the corresponding Web page.

Hotlink Navigation

Figure 4A:
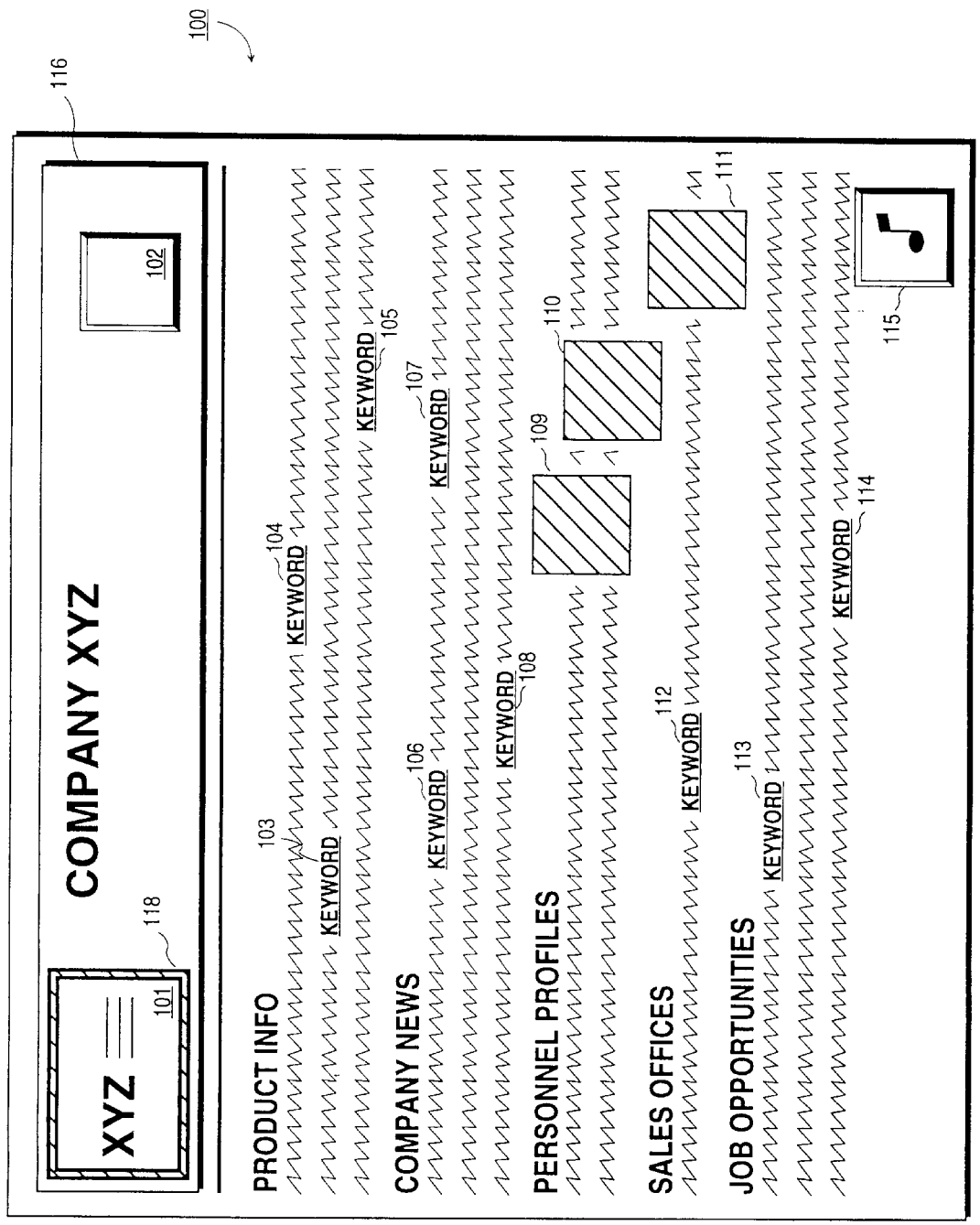
FIGS. 4A and 4B illustrates a displayed page of information containing a number of hypertext anchors.

FIG. 4A illustrates an example of a Web page 100 which may be displayed by television 12 using the client system. Web page 100 is a sample home page for a fictitious company, Company XYZ. Web page 100 includes a number of hypertext anchors 101–115, each of which provides a link to another Web page that is not currently displayed. In Web page 100, hypertext anchors 101, 102, 109, 110, 111, and 115 are image maps. Hypertext anchors 101 and 102 are included within image map 116, which is not a hypertext anchor. Hypertext anchor 101 is the logo for Company XYZ. Logo anchor 101 may provide a link, for example, to another Web page which provides a history of company XYZ. Hypertext anchor 115 may provide a link, for example, to an audio stream which generates the jingle (theme song) of Company XYZ, and which can be output to the user through the speaker of television 12. The remainder of the Web page 100 contains informational text about Company XYZ grouped under the headings: "Product Information," "Company News," "Personnel Profiles," "Sales Offices," and "Job Opportunities." Hypertext anchors 103–108 and 112–114 are key words or phrases within the text.

The application software 31 provides a means for the user to navigate between the hypertext anchors displayed on a Web page, such as Web page 100, using the remote control 11. In particular, application software 31, in response to user inputs from remote control 11, moves a selection from one hypertext object to another in a discrete movement. At a given point in time, only one displayed hypertext object is selected and is displayed as a current selection. In FIG. 4A, for example, hypertext anchor 101 is selected and is indicated as the current selection by highlighting 118. Once a hypertext anchor is selected, the user can activate its link to another Web page by pressing "Enter" button 19. To change the current selection, the user specifies a direction in which he wishes to "move" the selection by pressing any of direction buttons 15–18 on remote control 11. In response to one of these inputs, the application software 31 determines which of the other hypertext objects in the HTML document, if any, to select and display as the new current selection. In prior systems, the user is required to move a pixel-accurate cursor over the screen in continuous movements and to determine when the cursor coincides with a hypertext anchor. In contrast, the present invention determines the location of all hypertext objects and selects a new hypertext anchor based on the inputs received from remote control 11. The user is not required to locate hypertext objects.

Figure 4B:
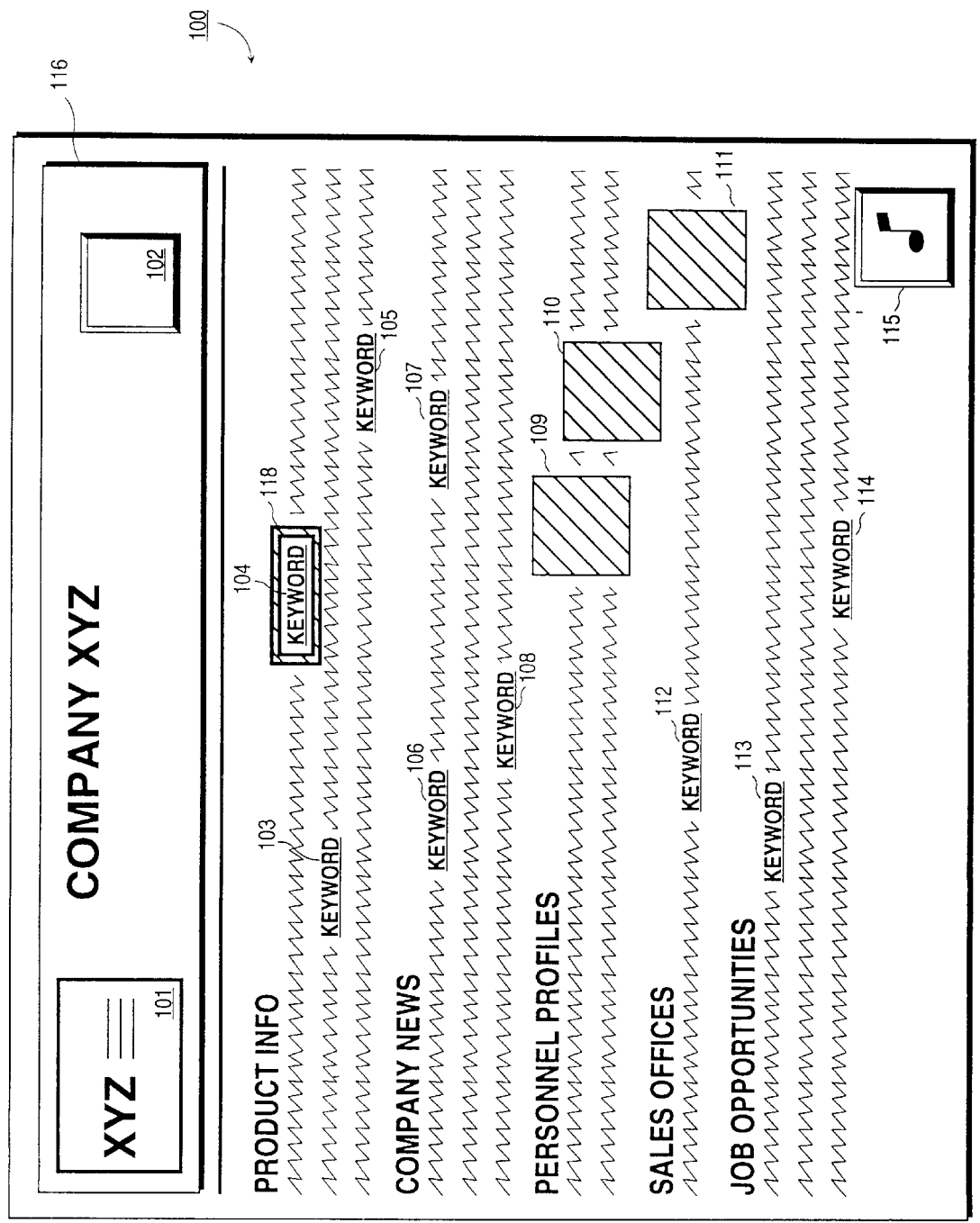

Assume now that the user wishes to change the current selection, hypertext anchor 101, to a new hypertext anchor—anchor 104, for example. The present invention allows the user to do this by pressing one of direction buttons 15–19 on remote control 11. FIG. 4B illustrates the Web page 100 as displayed with the anchor 104 as the current selection, as indicated by highlighting 118. Using remote control 11, the user may move the current selection successively through all of the displayed hypertext anchors and may also access and select hypertext anchors in the current HTML document which are not currently displayed by scrolling the document.

Figure 5:
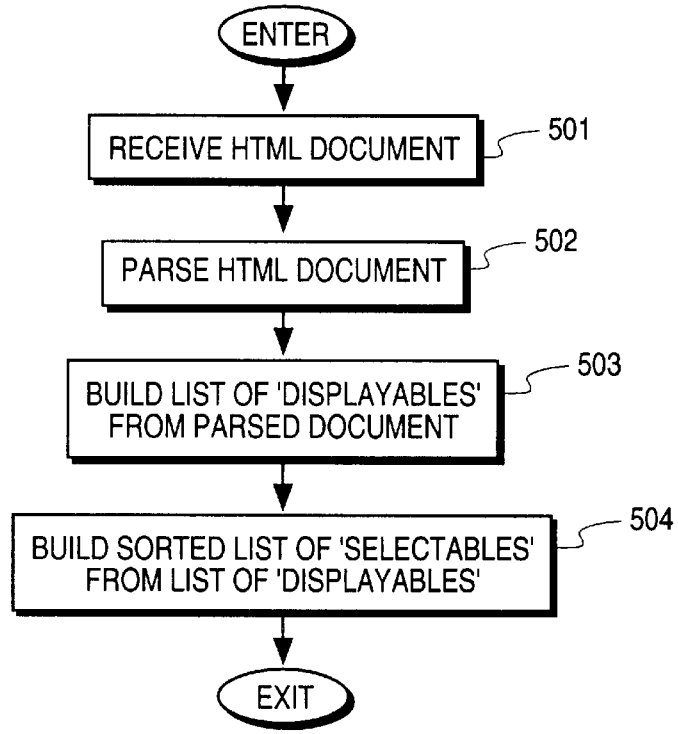
FIG. 5 is a flow diagram illustrating a procedure for receiving and processing of an HTML document according to the present invention.

FIG. 5 illustrates a process of setting up a data structure performed by the application software 31 in order to permit the functions just described. Initially, an HTML document is received via the network connection 29 (step 501). Next, the HTML document is parsed into text and tags (step 502). From the parsed HTML document, a list is generated of the displayables in the current HTML document (step 503). Displayables may include either text or images. Methods of identifying displayables in an HTML document are well known and need not be discussed herein. From the list of displayables, a sorted list of selectables (e.g., hypertext anchors) is generated (step 504).

The list of selectables is sorted as it is generated according to an insertion sort routine. The selectables are sorted according to their positioning on the Web page, as it is to be displayed. More specifically, the list of selectables is formed according to the direction of reading or writing in the English language (i.e., left to right, top to bottom). Sorting is performed first according to vertical position, and then according to horizontal position. Accordingly, a selectable would be inserted into the selectable list at a position before any selectables which it appears higher than on the Web page; a selectable would also be inserted into the selectable list at a position before any selectables that it appears to the left of on the Web page but have the same vertical position.

In performing the insertion sort to generate the list of selectables, the determination of vertical positioning requires a determination of whether a given selectable falls "above" or "below" an existing entry in a selectable list. This determination can be complicated by the fact that there is often overlap in the vertical direction between two selectables. In FIGS. 4A and 4B, for example, there is vertical overlap between anchors 109 and 110. The present invention resolves this difficulty in the following way: If there is overlap between a given selectable and another selectable, then the given selectable is considered to be "below" the other selectable if the overlap between the two selectables is less than one-half of the height of the smaller of the two selectables and the top of the given selectable is below the top of the other selectable. If the overlap is not less than one-half of the height of the smaller of the two selectables or if the top of the given selectable is not below the top of the other selectable, then the given selectable is not considered to be "below" the other selectable. This same criterion is applied to determine when a given selectable can be considered "above" another selectable. Further, this method of defining the conditions "above" and "below" is also used in moving the current selection in response to a user input, as will be discussed below.

Referring now to FIGS. 4A and 4B for example, the sorted list of selectables generated from Web page 100 would have the following order (listed by reference numeral): 101, 102, 104, 103, 105, 106, 107, 108, 109, 110, 112, 111, 113, 114, 115. It should be appreciated that in the actual implementation, the sorted list of selectables may actually constitute a list of pointers to entries in the list of displayables. Note that in reading Web page 100 from top to bottom (in English), a person would encounter anchor 104 before encountering anchor 103, since anchor 104 is in a line of text that is above the line of text including anchor 103. Consequently, anchor 104 appears before anchor 103 in the sorted list of selectables. Note further that anchor 112 appears before anchor 111 in the sorted list of selectables; this is so because there is overlap in the vertical direction between these two anchors, and the amount of overlap includes the entire height of anchor 112. Consequently, anchors 111 and 112 are considered to have the same vertical rank on Web page 100. However, since anchor 112 appears to the left of anchor 111, anchor 112 is inserted into the sorted list before anchor 111.

Figure 6:
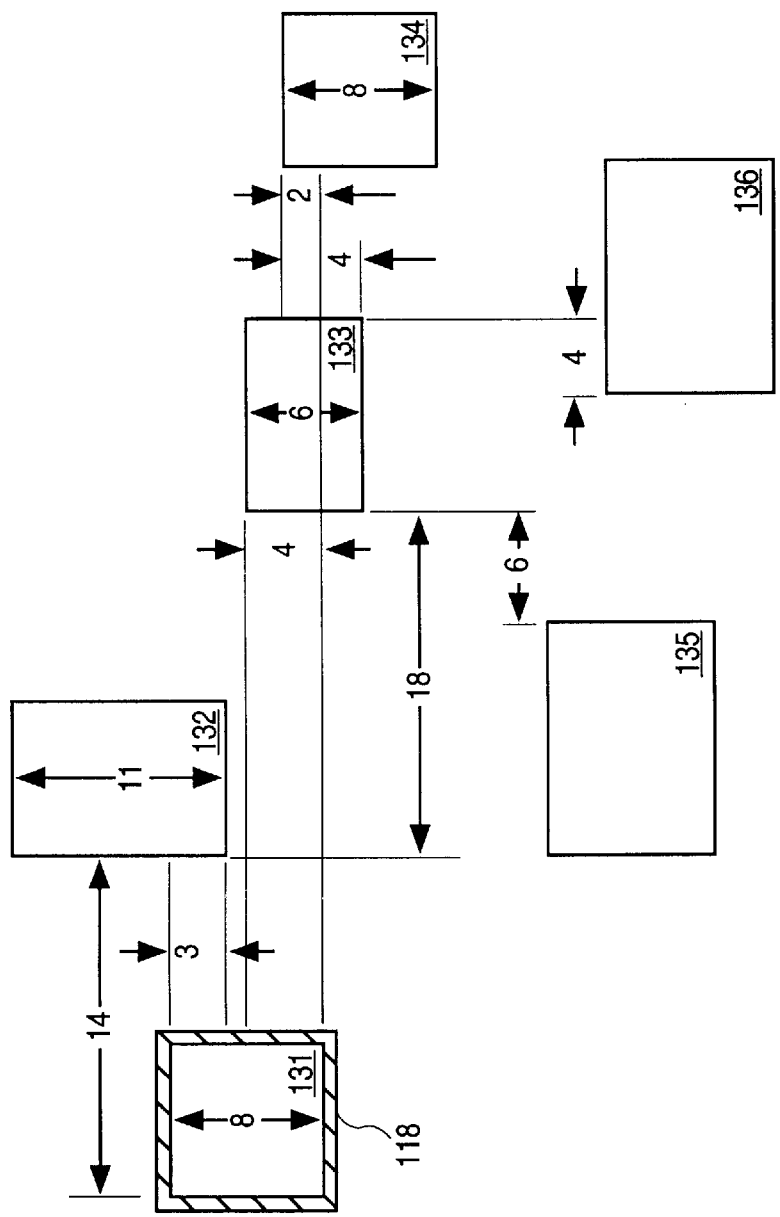
FIG. 6 illustrates several hypertext anchors as displayed on a display device.
Figure 7A:
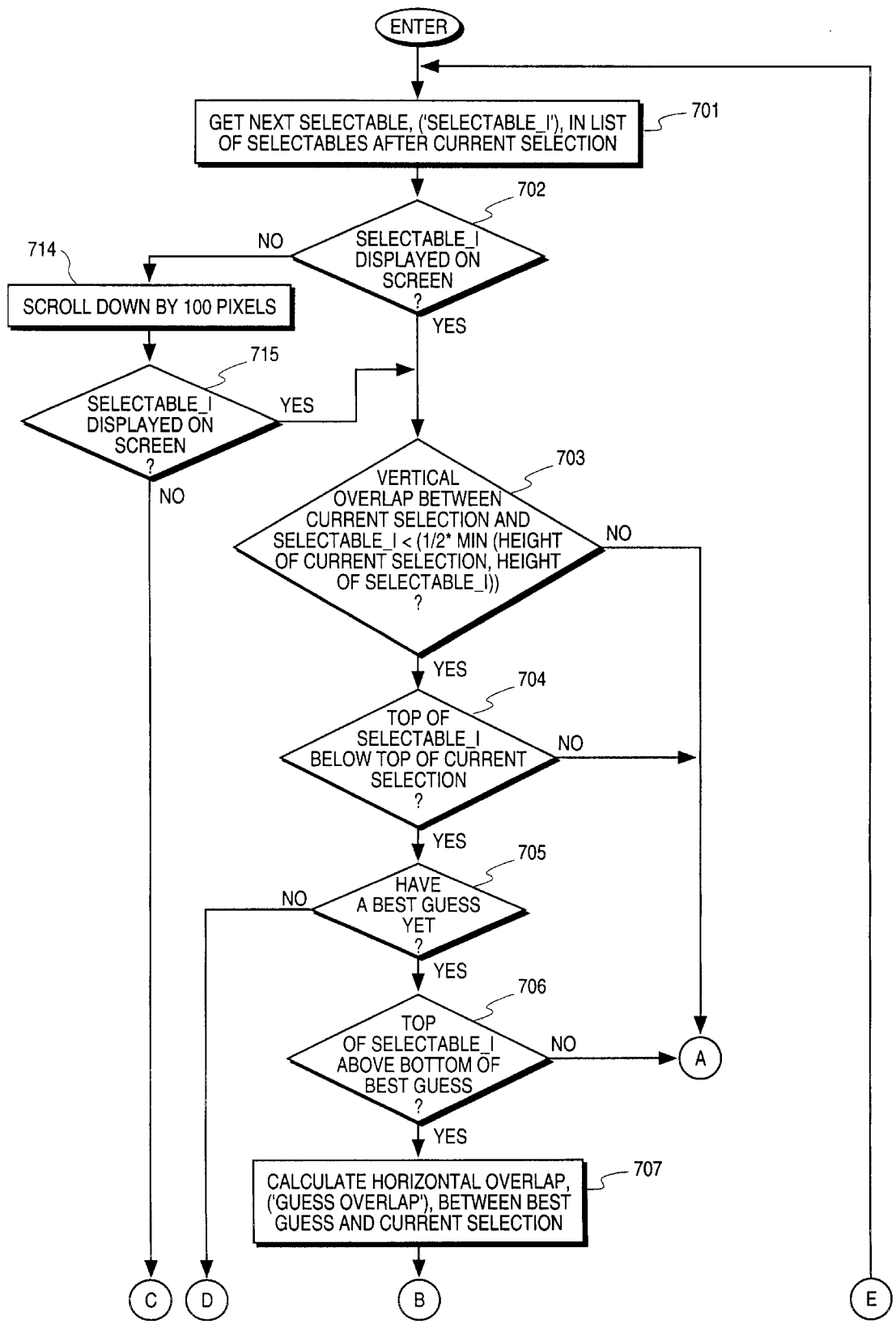
FIGS. 7A and 7B are a flow diagram illustrating the procedure of movement of a selection between two hypertext anchors in the downward direction using the remote control of FIG. 3.
Figure 7B:
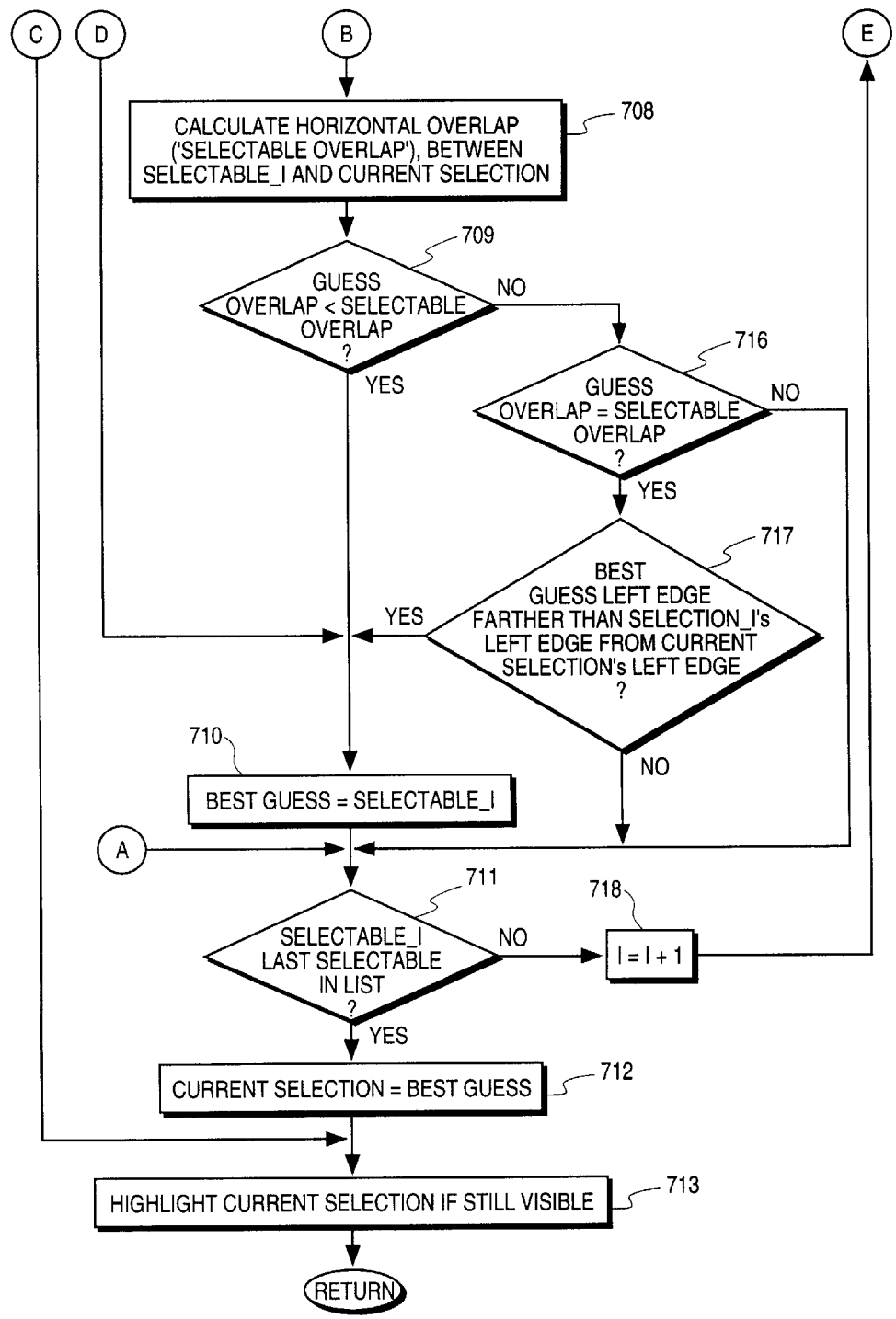

The method of moving a selection between hypertext anchors using remote control 11 will now be described with reference to FIGS. 6, 7A, and 7B. As mentioned above, a user may move the current selection left or right by one hypertext anchor by pressing left button 15 or right button 16, respectively. In response to receiving an IR signal corresponding to either button 15 or button 16, the software 31 of the present invention (specifically, selection handler 55) simply moves one position through the sorted list to determine the new current selection. That is, if left button 15 was pressed, the new current selection will be one position higher in the sorted list from the current selection, whereas, if right button 16 was pressed, the new current selection will be one position lower in the sorted list from the current selection. In response to any of direction buttons 15–18 being pressed, a new current selection will be determined and the highlighting 118 will be moved to indicate the new current selection. The screen may be scrolled to display the current selection, as discussed below. As mentioned above, the user may activate the hypertext link of the current selection by pressing "Enter" button 19.

Movement of the current selection in response to down button 18 being pressed will now be described with reference to FIGS. 7A and 7B. When down button 18 is pressed, each entry (selectable) that appears in the sorted list after the current selection is examined according to the following routine to determine whether it is a Best Guess. The Best Guess is a selectable which is, at least temporarily, considered to be the most likely selectable to be the new current selection based on the last user input. As each entry in the list is tested, whichever entry is currently considered to be the Best Guess may then be replaced by the selectable being tested if the selectable being tested is determined to be a better choice. Once the end of the list is reached, the selectable that is designated as the Best Guess will be taken to be the new current selection. Accordingly, highlighting 118 will be moved to indicate the new current selection to the user.

In response to the down button 18 being pressed, the application software 31 initially determines which selectable in the sorted list of selectables is the next selectable after the current selectable (i.e., after the current selection) (step 701); the result of this determination will be referred to herein as "selectable$_{13}$ I". Next, the determination is made of whether selectable$_{13}$ I is currently displayed on the screen (step 702). If not, then the screen is scrolled down by a predetermined number of pixels, but less than an entire screen (step 714). An exemplary number of pixels is 100, although that number is essentially arbitrary. After the screen is scrolled down by the predetermined number of pixels, another determination is made of whether selectable$_{13}$ I is displayed on the screen (step 715). If the selectable$_{13}$ I is still not displayed on the screen, then the current selection is not changed, and the highlighting 118 is not moved (step 713). Note that if the current selection is no longer visible after the scroll, no selection is displayed.

If, however, after scrolling down by the predetermined number of pixels (step 714), selectable$_{13}$ I is displayed on screen, or if selectable$_{13}$ I was displayed initially (step 702), then a determination is next made of whether the vertical overlap between the current selection and selectable$_{13}$ I is less than one-half of the height of the smaller of the current selection and selectable$_{13}$ I (step 703). If so, a determination is made of whether the top of selectable$_{13}$ I is below the top of the current selection (step 704). Note that the order of these two determinations (steps 703 and 704) can be reversed, if desired. Note also that these two determinations constitute the same test used to determine the "below" condition when generating the sorted list of selectables.

If the answer to either of these two determinations is "no," then the process proceeds to a determination of whether selectable$_{13}$ I is the last selectable in the sorted list (step 711). If selectable$_{13}$ I is not the last selectable in the list, then the procedure of FIGS. 7A and 7B is repeated, taking the next selectable in the list as selectable$_{13}$ I (steps 718, 701). Alternatively, if selectable$_{13}$ I is the last selectable in the list, then the new current selection is taken to be whichever selectable is currently designated as the Best Guess, as explained below (step 712).

If (in step 703) the vertical overlap between the current selection and selectable$_{13}$ I is less than one-half of the height of the smaller of the current selection and selectable$_{13}$ I, and (in step 704) the top of selectable$_{13}$ I is below the top of the current selection (step 704), then it is next determined whether there is currently a Best Guess (step 705). If there is not yet a Best Guess, then the Best Guess is taken to be selectable$_{13}$ I (step 710). Again, if selectable$_{13}$ I is not the last selectable in the list, then the process repeats from the beginning with the next entry in the list. If (in step 705) there was already a Best Guess, then a determination is made of whether the top edge of selectable$_{13}$ I has a higher vertical position (smaller "Y" coordinate) than the bottom edge of the Best Guess selectable (step 706). If not, then selectable$_{13}$ I is disregarded as a potential new Best Guess, since it is lower on the screen than the current Best Guess. The reason for disregarding selectable$_{13}$ I in this case is an assumption that the user would not wish to jump from the current selection to selectable$_{13}$ I if there is another selectable that is below the current selection but above selectable$_{13}$ I. Accordingly, in that situation a determination is again made as to whether selectable$_{13}$ I is the last selectable in the list (step 711). If not, the process repeats from the beginning (steps 718, 701) using the next entry in the list.

If (in step 706) the top of selectable$_{13}$ I is higher than the bottom of the Best Guess, then it is determined how much overlap, Guess Overlap, exists (if any) between the Best Guess and the current selection (step 707) in the horizontal direction. Similarly, a determination is made of how much horizontal overlap, Selectable Overlap, exists (if any) between selectable$_{13}$ I and the current selection (step 708). If Guess Overlap is less than Selectable Overlap (step 709), then the Best Guess is replaced by selectable$_{13}$ I (step 710); that is, selectable$_{13}$ I is then considered to be the new Best Guess. Accordingly, the process repeats using the next entry in the sorted list of selectables, assuming selectable$_{13}$ I was not the last selectable on the list.

If (in step 709) Guess Overlap is not less than Selectable Overlap, then two situations might exist. The first situation is that the overlap amounts are equal (i.e., Guess Overlap= Selectable Overlap). The second is that Selectable Overlap is greater than Guess Overlap. Generally, the amount of horizontal overlap will be equal when Guess Overlap and Selectable Overlap are both zero (i.e., when neither selectable$_{13}$ I nor the Best Guess overlaps the current selection horizontally). If Guess Overlap and Selectable Overlap are equal, then selectable$_{13}$ I is taken to be the new Best Guess (in step 710) only if the left edge of the Best Guess is farther from the left edge of the current selection than the left edge of selectable$_{13}$ I is from the left edge of the current selection (step 717). Otherwise, the process repeats using the next selectable in the list.

If Guess Overlap is not less than Selectable Overlap and either: (1) the Guess Overlap does not equal Selectable Overlap, or (2) the left edge of Best Guess is closer to the left edge of the current selection than the left edge of selectable$_{13}$ I is to the left edge of the current selection (steps 716 and 717), then the Best Guess is retained, and the process repeats (unless selectable$_{13}$ I was the last selectable in the list).

Once the last selectable in the list has been tested using the process just described, then the new current selection is taken to be whichever selectable is currently the Best Guess (step 712). The new current selection is then highlighted (step 713).

The procedure of FIGS. 7A and 7B will now be explained with reference to FIG. 6. FIG. 6 shows a number of hypertext anchors 131–136 and defines certain spatial relationships between those anchors. A sorted selectable list of the anchors in FIG. 6 would have the following order: 132, 131, 133, 134, 135, 136. Assume now that the current selection is anchor 131 as indicated by highlighting 118. Assume further that the user has just entered an input by pressing the down button 18 on remote control 11. In response, the application software 31 initiates the process of examining entries in the sorted selectable list which follow selectable 131 (i.e. beginning with selectable 133). Note that selectable 132 appears before 131 in the sorted list because it is "above" selectable 131 (according to the criteria described above) and is therefore not considered in response to the down button 18 being pressed. Therefore, according to the routine of FIGS. 7A and 7B, the amount of vertical overlap between selectable 133 and selectable 131, if any, is determined. In this example, the amount of overlap is four units. The dimensions illustrated in FIG. 6 are provided only for purposes of illustration and can have essentially any units, such as pixels, for example. Since the amount of vertical overlap (four units) between selectable 133 and selectable 131 is greater than one-half of the height of the smaller of these two selectables (one-half of the height of selectable 133, which is ⁶⁄₂, or 3), selectable 133 is not considered to be "below" selectable 131. Consequently, since there is currently no Best Guess, selectable 133 is ignored and the next selectable in the list, selectable 134, is examined. (If there were currently a Best Guess, then that Best Guess would be retained.)

Continuing now through the sorted list of selectables, selectable 134 overlaps selectable 131 in the vertical direction by two units. Two units is less than one-half of the height of the smaller of these two selectables (which are equal in height). Further, the top edge of selectable 133 is below the top edge of selectable 131. Therefore, selectable 134 is considered to be "below" selectable 131, and selectable 134 is taken to be the new Best Guess (step 710). The next selectable to be examined is selectable 135. Selectable 135 does not overlap selectable 131 and is, therefore, considered to be below the current selection. However, the top edge of selectable 135 is below the bottom edge of the Best Guess, selectable 134. Therefore, selectable 135 is not a "better" Best Guess than the current Best Guess, selectable 134. Consequently, selectable 134 is retained as the Best Guess and the next selectable in the list, selectable 136 is examined. Essentially the same analysis applies to selectable 136 as to selectable 135. Therefore, when the end of the sorted list is reached, the Best Guess remains selectable 134. Consequently, it is determined that the new current selection is selectable 134. Accordingly, selectable 134 is highlighted to so indicate.

In a different scenario, assume now that the current selection is selectable 132 and that down button 18 is pressed. The next selectable in the sorted list of selectables after selectable 132 is selectable 131. Therefore, selectable 131 is the first selectable to be examined. Selectable 131 does not overlap selectable 132 by more than four units (½ the height of selectable 131). Further, the top edge of selectable 131 is below the top edge of selectable 132. Therefore, selectable 131 is considered to be "below" selectable 132 and is taken to be the Best Guess. Moving through the sorted list, the next selectable to be examined is selectable 133. Selectable 133 meets the conditions for being "below" the current selection, selectable 132. Moreover, the top edge of selectable of 133 is not below the bottom edge of the current Best Guess, selectable 131. Therefore, selectable 133 is, so far, not eliminated from consideration. Instead, the amount of horizontal overlap is determined between selectable 133 and the current selection selectable 132 and between selectable 131 and the current selection. In this case, both selectable 131 and selectable 133 have no horizontal overlap with the current selection, selectable 132. Therefore, the next step is to determine (step 717) whether the left edge of the current selection is closer to the left edge of selectable 131 or to the left edge of selectable 133. Here, the left edge of 131 is closer. Therefore, selectable 131 is retained as the Best Guess (step 710). The above process then continues by examining the next selectable in the sorted list, selectable 134, and so forth, until the end of the sorted list is reached. At that point, the Best Guess is taken as the new current selection.

In yet another scenario, assume that the current selection is selectable 133 and that down button 18 was just pressed. Selectable 134 is the first selectable in the list to be examined. The overlap between selectable 134 and 133 is greater than one-half the height of the smaller of these two selectables (i.e., greater than ⁶⁄₂, or 3). Therefore, selectable 134 is eliminated from consideration. At this point there is no Best Guess. Selectable 135 is considered next. Selectable 135 does not vertically overlap the current selection, selectable 133, and the top of selectable 135 is below the top of the current selection. Therefore, selectable 135 is taken to be the Best Guess. Next, selectable 136 is considered. Selectable 136 does not overlap the current selection, nor is the top edge of the selectable 136 below the bottom edge of selectable 135. Therefore, the horizontal overlap between the Best Guess and the current selection (Guess Overlap), and between selectable 136 and the current selection (Selectable Overlap), are determined. The Guess Overlap is zero. However, Selectable Overlap is four units. Therefore, because Selectable Overlap is greater than Guess Overlap, selectable 136 is taken to be the new Best Guess. Further, since selectable 136 is the last selectable in the sorted list, the new current selection is taken to be the current Best Guess, selectable 136.

Figure 7C:
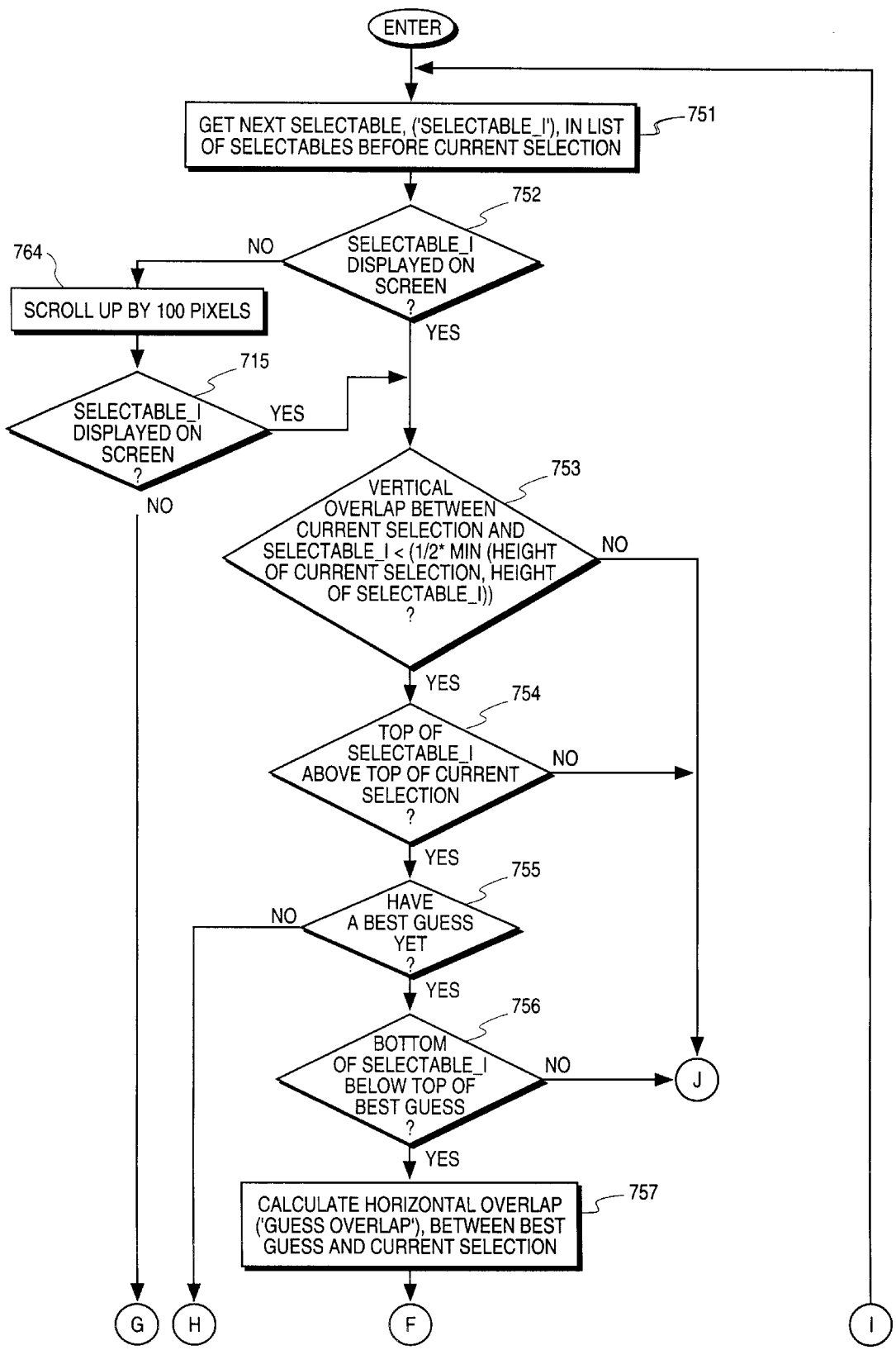
FIGS. 7C and 7D are a flow diagram illustrating the procedure of movement of a selection between two hypertext anchors in the upward direction using the remote control of FIG. 3.
Figure 7D:
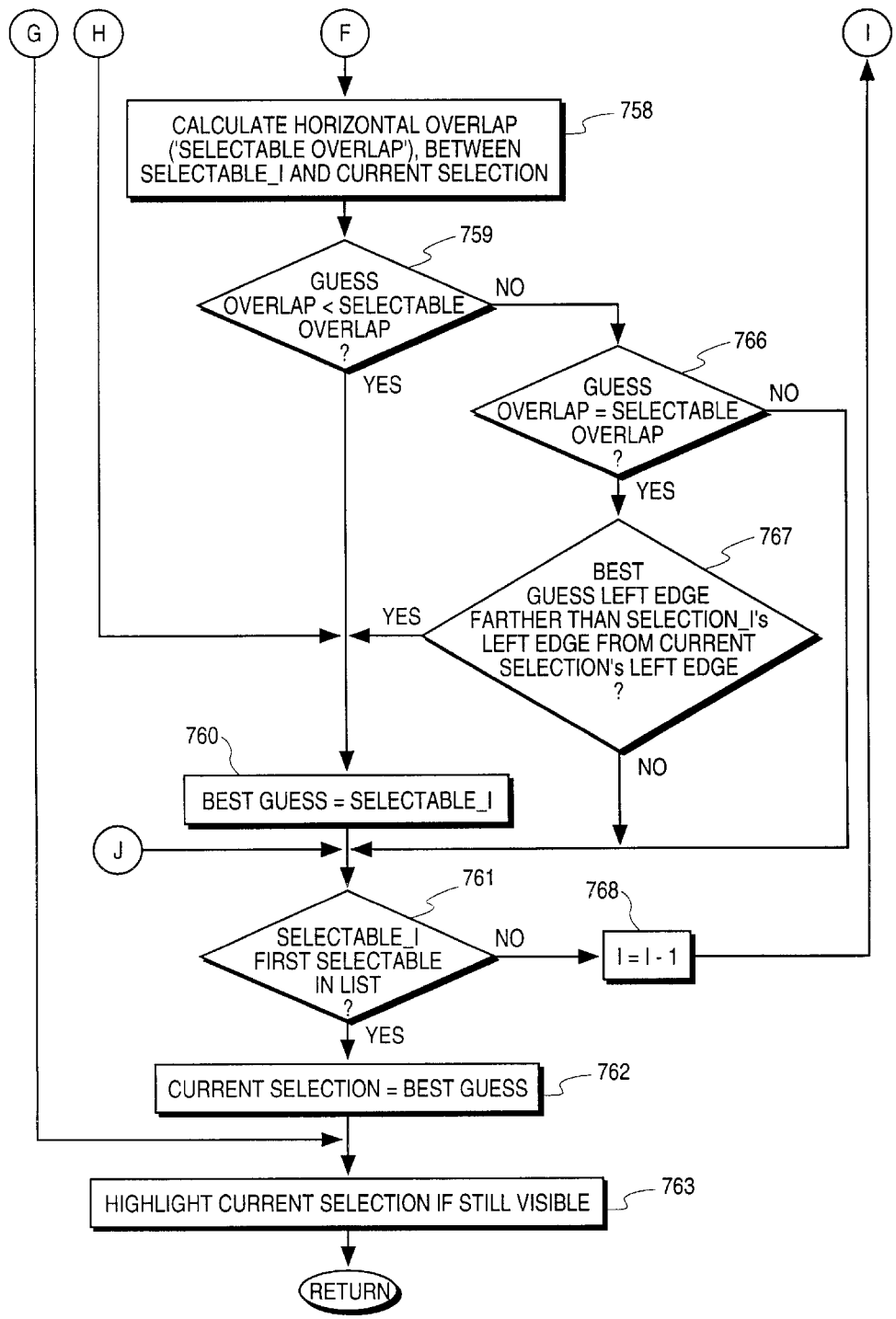

The procedure of changing the selection in response to up button 17 being pressed is illustrated in FIGS. 7C and 7D. The procedure for up button 17 is substantially identical to the procedure for down button 18 (FIGS. 7A and 7B) and therefore need be not be described on a step-by-step basis.

Nonetheless, certain differences should be noted. In response to the up button 17, in contrast with the procedure for down button 18: (1) entries in the list of selectables are examined moving backward through the list (not forward) starting with the selectable immediately preceding the current selection (steps 751, 768), until all selectables in the list preceding the current selection have been examined; (2) the amount of vertical overlap is calculated in order to determine whether a selectable, selectable$_{13}$ I, is "above" the current selection, not "below" (step 754); (3) selectable$_{13}$ I is ignored as a possible new current selection if the bottom of selectable$_{13}$ I is above the top of the current Best Guess (step 756); and, (4) if selectable$_{13}$ I is not currently displayed, the screen is scrolled up (not down) by a predetermined number (e.g., 100) of pixels.

Image Maps

Another feature provided by application software 31 is that it can distinguish between and handle various types of image maps, such as "client-side" image maps and "server-side" image maps. A "client-side" image map is defined herein to be an image map for which the client system has a URL. The client system can therefore directly access any Web page to which a client-side image map is linked. In contrast, a "server-side" image map is defined herein to be an image map which is or includes one or more hypertext anchors, the URLs of which are not available to the client system. That is, the information for a server-side image map is stored on one or more server systems. The client system activates a link to a server-side image map by transmitting the screen coordinates corresponding to that image map to one of the server systems, which in turn accesses the URL of the corresponding hypertext object.

Referring again to FIG. 4A, Web page 100 includes image map 116. Image map 116 includes hypertext anchors 101 and 102. Assume now that image map 116 is a client-side image map. Therefore, in moving the current selection in response to user inputs, hypertext anchors 101 and 102 are treated as any other hypertext objects on Web page 100. That is, the selection can be moved back and forth between anchors 101 and 102, or between either of these anchors and any other anchor on Web page 100, using the direction buttons 15–18. Assume instead that image map 116 is a server-side image map. In that case, the HTML document received by the client system does not specify the URLs associated with hypertext anchors 101 and 102. Therefore, the entire image map 116 is treated as a single selectable for purposes of navigating between selectables.

Figure 8:
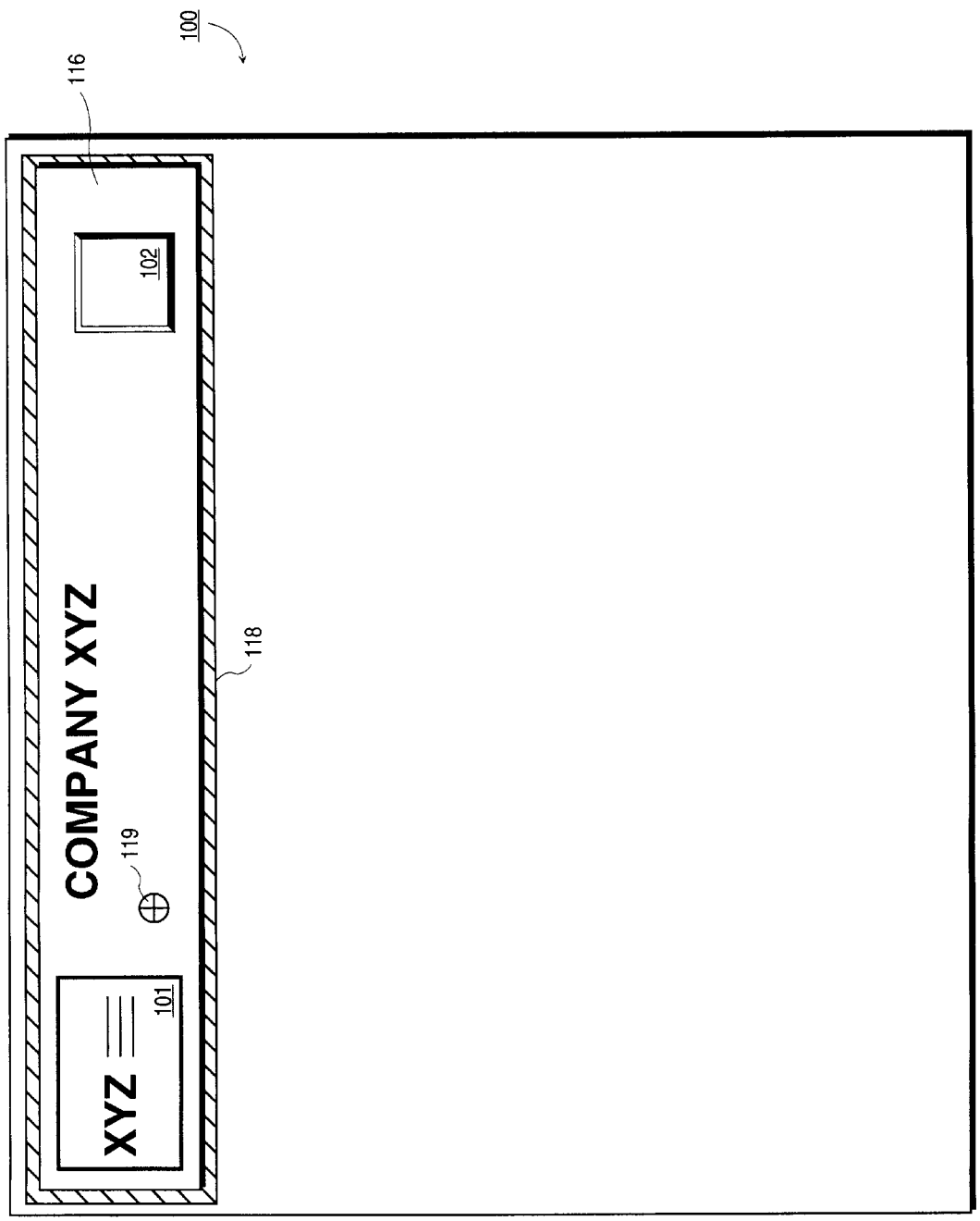
FIG. 8 illustrates a display screen displaying a server-side image map and a selection icon.

When a server-side bit map is currently selected, a selection icon, such as a cross-hairs 119, will be displayed within the boundaries of the image map, as shown in FIG. 8, in response to the user's pressing "Enter" button 19. Once the selection icon is displayed, the directional buttons 15–18 will control movement of the selection icon. Each time one of buttons 15 through 18 is pressed, the selection icon will be moved a predetermined number of pixels in the direction represented by that button. If a directional button is pressed multiple times in rapid succession, or if the user holds a directional button down, the distance which the cross-hairs 119 are moved for each press of the button will be increased over the normal distance increment. When the user presses "Enter" button 19, the coordinates of cross-hairs 119 relative to the upper left corner of the image map are transmitted by the client system over the network connection 29 to the server system which provided the HTML document and which has the URL or other address of any hypertext anchors included in the server-side image map. If the transmitted coordinates coincide with a hypertext anchor, (e.g., anchor 101 or 102 in FIG. 8), the server system then accesses the Web page at the corresponding URL or other address and transmits an HTML document defining that Web page to the client system.

Figure 9:
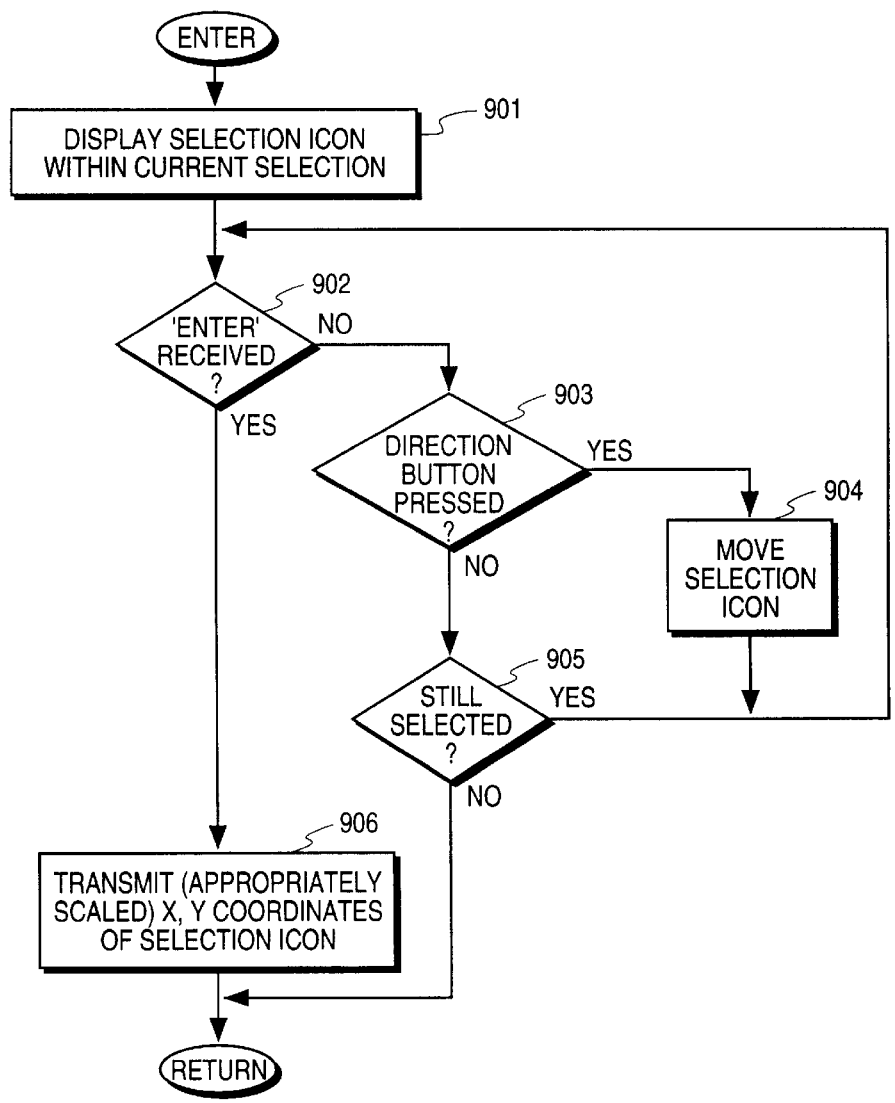
FIG. 9 is a flow diagram illustrating a procedure for selecting an image map displayed on a display device and for accessing a Web page represented by the image map.

As noted above, an image map may be or may include one or more hypertext anchors. FIG. 9 illustrates a procedure by which the present invention handles server-side image maps. Note that the determination of whether an image map is a client-side image map or a server side image map is made at layout time based on the contents of the received HTML document. The method of making such a determination is well-known. Referring to FIG. 9, when the current selection is a server-side image map, the selection icon 119 is displayed superimposed on the image map within the boundaries of the image map (step 901). Any convenient point within the image map, such as the centroid of the image map, can be taken as the point at which the selection icon is initially displayed. The system then waits for either the "Enter" command or an input entered through one of the direction buttons 15–18 to move the selection icon (steps 902 and 903), as long as the image map is selected (step 905). If an input is received from one of buttons 15-18, then the selection icon is moved accordingly (step 904). If the "Enter" command is received via button 19, then the client system transmits the X,Y coordinates of the selection icon over the network connection 29 (step 906). In response, the server system which provided the HTML document determines whether the coordinates correspond to a hypertext anchor, as described above. If so, the Web page at the corresponding address is retrieved and transmitted back to the client system over the network connection 29.

In some cases, images which are downloaded via the network connection 29 will not be appropriately sized for display on television set 12. This is because images generally will be sized for display on a computer monitor rather than on an ordinary television set. One prior art solution for dealing with Web pages larger than the display is to allow horizontal and vertical scrolling. However, it has been found that horizontal scrolling can be confusing to some people.

Because a key aspect of the present invention is to simplify the user interface for Web browsing, therefore, the present invention provides a mechanism to eliminate the need for horizontal scrolling for oversized Web pages. This mechanism is a scaling operation to reduce the image size of all Web page elements to fit within the horizontal dimension of a television-formatted display. Since it is desirable to retain uniform proportions, the scaling operation is performed on both the horizontal and vertical dimensions using the same scale factor. However, the scaling factor is based only upon the amount of scaling necessary to fit the Web page within the horizontal borders of a television display. The value of the scaling factor will depend upon the particular television format used by the client 1 (e.g., NTSC, PAL, etc.). Thus, the only user scrolling operation required by the present invention is vertical scrolling.

In one embodiment, the scaling operation is performed in the client 1 by the Web browser. In another embodiment, the scaling is performed in the server 5, which functions as a proxying server in such embodiment.

This scaling operation must be taken into account when transmitting coordinates of the selection icon within a server-side image map; otherwise, the transmitted coordinates will be inaccurate. Therefore, before the coordinates of the selection icon are transmitted across the network connection 29, the coordinates must be scaled up based on the scale factor that was used to scale the image map down.

Figure 10:
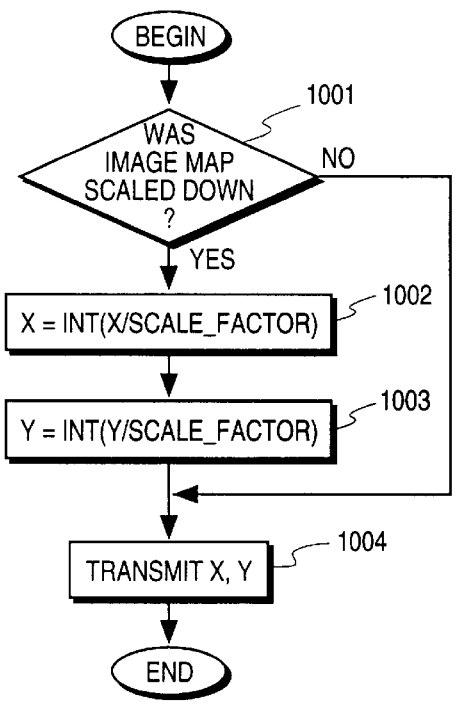
FIG. 10 is a flow diagram illustrating a process for rescaling cursor coordinates in relation to a scaled-down image map.

FIG. 10 illustrates the procedure for rescaling coordinates before transmitting. Initially, it is determined whether the image map was scaled down for display on television set 12 (step 1001). If not, then the X,Y coordinates of the selection icon 119 are transmitted unchanged. If the image map was scaled down, then the new X coordinate is taken to be the old X coordinate, divided by the scale factor, and then truncated to an integer value (step 1002). The scale factor is assumed here to be between zero and one. Similarly, the new Y coordinate is taken to be the old Y coordinate divided by the scale factor, and then truncated to an integer value (step 1003). The new X and Y coordinates are then transmitted over the network connection 29 (step 1004) to the server system.

Web Page by Address

Figure 11:
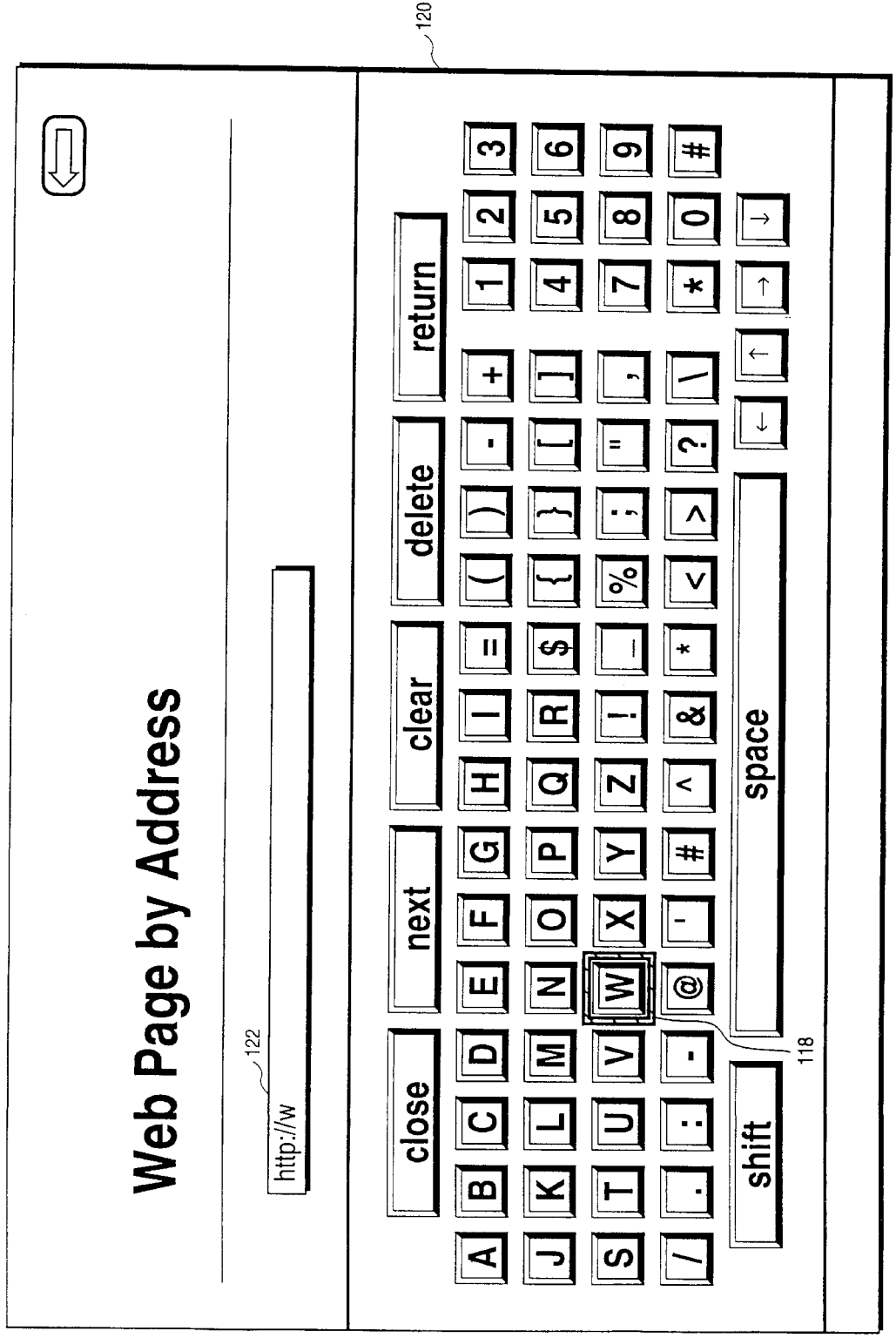
FIG. 11 illustrates an image of an alphanumeric keyboard as displayed on a display device by the application software of the present invention.

The application software 31 also provides a means by which the user can access a given Web page directly when the user knows the URL of that Web page. Using remote control 11, the user accesses this feature by pressing an appropriate button, such as Option button 7, to access a menu and then selecting the appropriate menu item. Upon receiving this input via the IR interface, software 31 would display a screen on television set 12 as shown in FIG. 11. The display screen includes an image map including a representation of an alphanumeric keyboard. Each key in the keyboard image is represented as a distinct object in software 31 and functions as a "soft button"; that is, each key can be selected and used to enter the letter it represents using the remote control 11. Control of the selection indicator 118 between the various soft buttons in the alpha numeric keyboard image is performed in essentially the same manner used to control movement between the hypertext anchors as described above.

When the keyboard image 120 is initially displayed, one of the keys is highlighted, such as the "A" key. The user may then use the directional buttons 15–18 on remote control 11 to move the selection on the screen. The user enters any given letter by selecting that letter and then pressing "Enter" button 19. This causes the selected letter to be recognized by the client system and displayed in window 122. Once the user enters the complete URL, the URL can be transmitted by selecting the "Return" key and then pressing "Enter" button 19. In response the client system will transmit the URL over network connection 29 in order to access the corresponding Web page.

Of course, a conventional keyboard (for example, a battery-powered IR keyboard) can be used optionally with the present invention. In that case, the user may directly enter text without the need to display a keyboard image on screen.

Revisiting Web Sites

Prior art Web browsers have certain limitations in the way they provide the "Forward" and "Back" functions, as described above (see "Background of the Invention"). In particular, analogizing Web browsing to moving through a tree hierarchy of Web pages, there is often ambiguity in the prior art when moving down one level (Web page) in the tree hierarchy to a level that was already visited, since there may be many branches (hypertext links) from each level. Further, if the user wishes to return to where he was after having backed up by several levels, he generally must remember the path he took to get there and then retrace his steps exactly. Therefore, the application software 31 includes a mechanism, known as the "Recent" function, which overcomes these limitations. The "Recent" function subsumes the "Forward" function while eliminating the above-described ambiguity and providing additional functionality.

The application software 31 maintains a history of the Web sites visited, including the associated logical address (e.g., URL) of each site, in order to allow the user to revisit Web sites. When the user presses Recent button 37, this saved information is retrieved, and a "Recent" display is generated including visual representations of several of the most recently visited Web sites, regardless of their positions in the tree hierarchy. The "Recent" display therefore represents a sequential history of Web sites recently visited prior to the current Web site.

Figure 12:
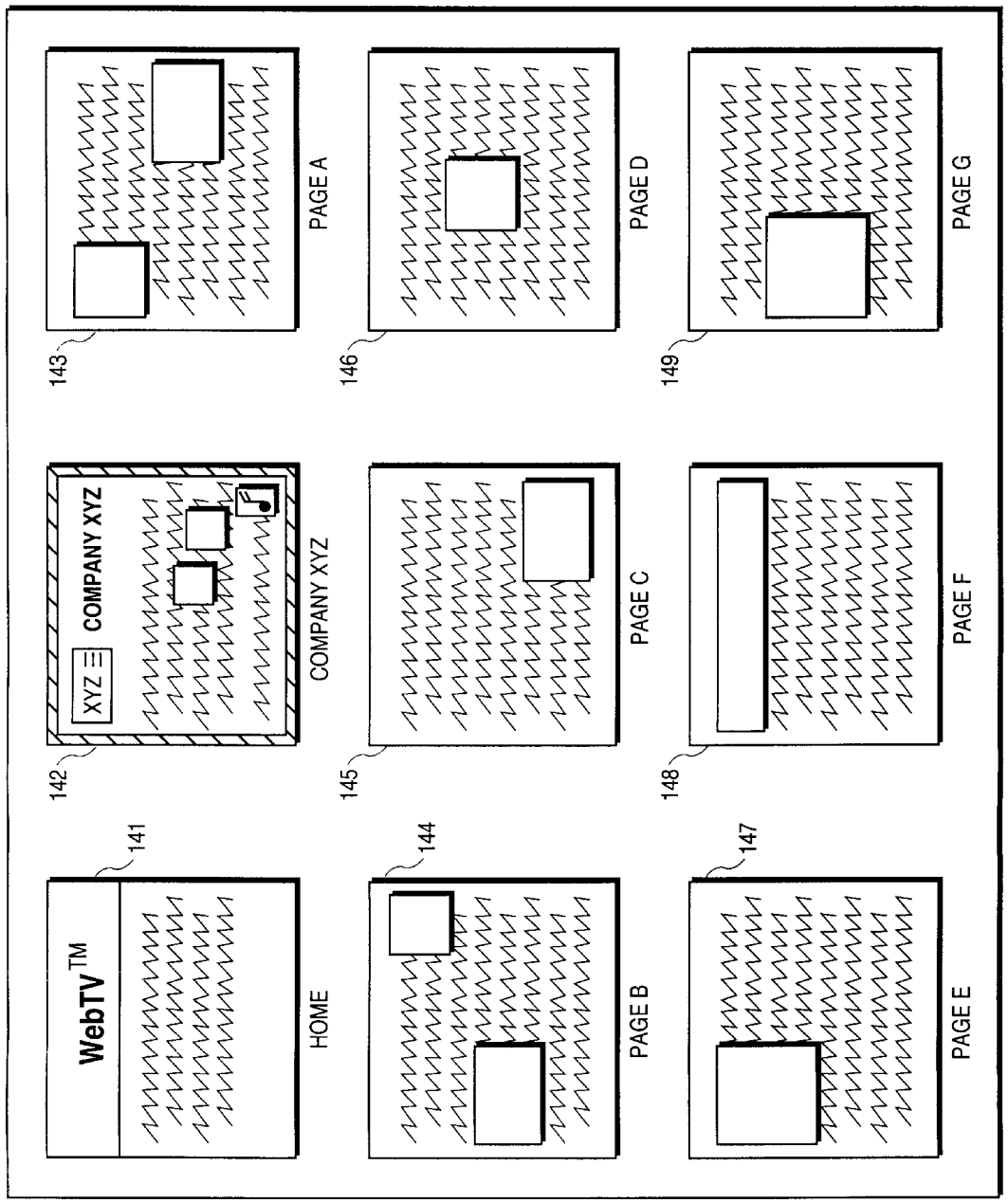
FIG. 12 illustrates an example of a display showing representations of recently visited Web sites.

FIG. 12 illustrates an example of a "Recent" display. The "Recent" display includes a number of images 141–149 displayed in row-and-column format. The images 141–149 are scaled-down images of the most recently visited Web pages. The user can press the directional buttons 15–18 to select one of the recent Web sites (the selected site being indicated by highlighting 118) and then press the Enter button 19 to return directly to the selected site. Note that the user can also directly return to the WebTV™ home page by selecting and entering image 141. The title of each represented Web page is also displayed with its associated image to allow the user to more easily identify the page. Hence, each time an HTML document representing a Web page is received, the title of the Web page, as specified in the HTML document, is saved as part of the historical information for later use with the "Recent" function.

When the user presses the Back button 36, the user is taken to the previously-visited Web page in reverse chronological order. That is, each time the Back button 36 is pressed, the user is taken up one level in the tree hierarchy. The application software 31 automatically causes the URL of that site to be invoked. In addition, the application software 31 also saves the selection that was entered by the user (using Enter button 19) at each Web site. Therefore, as each Web site is revisited in response to the Back button 36, the selectable that the user entered when he previously visited that site is automatically highlighted as the current selection. Hence, the user only needs to press the Enter button 19 to reverse direction and retrace his steps going forward (down the tree hierarchy). This feature allows the user to maintain his context for each Web page, which may be several screens long. In addition, if that selectable is a server-side image map, the selection icon (e.g., cross-hairs 119; see FIG. 8) is automatically displayed in the image map in response to the Back button 36, at the precise location at which it was located when the user pressed the Enter button 19.

As the user returns to each Web page moving forward, the selectable he previously chose at that page is automatically highlighted, as was the case when moving backward (up the tree). Consequently, if the user wishes to resume moving forward after having used the "Back" function, he is not required to remember which hypertext anchors he had originally selected. This feature, therefore, further serves to eliminate ambiguity associated with prior art "Forward" functions.

Favorites

The present invention provides a function by which the user can quickly access his favorite Web sites. In particular, the user may save any Web page he visits as a "Favorite". In addition, in one embodiment, the WebTV™ client 1 or the WebTV™ server 5 supplements the user-specified Favorites with a list of the Web sites most frequently visited by the user. The user can then select a "Favorites" menu item on the WebTV™ home page to see a representation of his favorite Web sites.

Selection of the "Favorites" menu item causes the user's favorite Web sites to be displayed in a form similar to that of the Recent display (see FIG. 12). That is, the "Favorites" display includes scaled-down images of various Web pages along with the title of each Web page. As with the Recent display, the user can directly access any Web site represented in the "Favorites" display by selecting one of the scaled-down images using the directional buttons 15–18 and Enter button 19.

Scrolling

By pressing Scroll Up button 8 or Scroll Down button 9, the user can cause the display to be scrolled up or down, respectively, to display undisplayed portions of the current Web page. The display is generally scrolled by approximately one entire screen. However, the amount of scrolling can be tuned to the user's preference. When scrolling down, the display will generally be scrolled so that the last currently-displayed line in the current HTML document becomes the top line of the new screen to be displayed. An exception occurs, however, if that HTML line is larger than one screen, as in the case of some large images and tables. In that case, the display is scrolled only by one screen. This technique provides the advantage that HTML lines containing large image maps or tables can be viewed more easily, since these lines will be lined up with the top of the screen when the user scrolls down.

When scrolling up, the display will generally be scrolled up so that the top line of the new screen is the highest fully visible HTML line of the previous screen. If that line is larger than one screen, however, then the display will only be scrolled up by one screen.

Audio Functions

The application software 31 includes the capability to cause music or sound effects to be played through a speaker of the television set 12 based on audio information received over the network connection 29. In the preferred embodiment, the audio information is in MIDI (Musical Instrument Digital Interface) format. Once decoded by the WebTV™ box 10, the received audio information is provided to the television set via an audio channel of video link 6. The WebTV™ network services provide MIDI audio information to the WebTV™ box 10 for the purpose of generating background music to the user. The application software 31 generally causes the background music to be played to the user while the user is either downloading or viewing Web pages. That is, MIDI sound information for generating background music is downloaded "on the fly" while views of other Web pages are downloaded, so that the user is provided with a continuous stream of music. In one embodiment, two or more songs are initially downloaded when the WebTV™ client system 1 initiates a connection to the server system 5. In order to provide a continuous stream of background music, one song is downloaded from the network while another song is being played to the user.

In one embodiment, the background music is suspended whenever a Web page has its own music, such that the background music associated with the Web page is played instead. Once the user leaves that Web page, the background music provided by the WebTV™ network services is resumed.

In addition, the application software 31 also provides certain special sound effects. The special sound effects are superimposed upon (i.e., played concurrently with) the background music. Some of the sound effects are used to provide the user with audio feedback when operating the remote control 11. For example, a specific sound effect is associated with each function of the remote control 11. Audio feedback such as this is advantageous, since the user of the present invention will likely be positioned farther from the display than he would be if he were using an ordinary personal computer to browse the Web.

Thus, a method and apparatus have been described for allowing a user to navigate between a plurality of hypertext objects displayed on a display device using a remote input device. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a client system in communication with at least one remote server system, the client system being coupled to a display devise a method of helping a user to navigate through an interactive display environment including a plurality of hypertext objects, the method comprising:

causing an image of a keyboard to be displayed on the display device, the image including a plurality of soft buttons representing alphanumeric characters;

receiving a first user input from the remote input device, the first user input for selecting one of the alphanumeric characters by specifying a direction of movement of a selection indicator among the soft buttons;

receiving a second user input for entering one of the soft buttons;

and inputting one of the alphanumeric characters as a selection in response to the second user input.

2. In a client system in communication with at least one remote server system. The client system being coupled to a display device, a method of helping a user to navigate through an interactive display environment including a plurality of hypertext objects. The method comprising:

receiving information corresponding to an image map from one of the server systems. The image map including at least one hypertext object. Each hypertext object having an address stored within the client system and associated with one of the server systems for accessing information stored in said one of the server systems;

causing the image map to be displayed on the display device;

identifying the hypertext objects included within the image map;

determining one of the hypertext objects within the image map to be a selected hypertext object based on a first user input entered from a remote input device; and identifying the selected hypertext object within the image map by displaying a selection indicator.

3. In a client system in communication with at least one remote server system, the client system being coupled to a display device. a method of navigating through an interactive display environment including a plurality of hypertext objects, the method comprising:

receiving information corresponding to an image map from one of the server systems. The image map including at least one hypertext object having an address stored in one of the server systems and not in the client system. The address corresponding to one of the server systems and for accessing information stored in one of the server systems, causing the image map to be displayed on the display device, receiving a first user input that selects the image map, displaying a selection icon on the display device in response to the image map being selected according to the first user input;

receiving a second user input entered from the remote input device specifying a movement of the selection icon;

receiving a third user input entered from the remote input device specifying coordinates within the image map, the coordinates corresponding to a current position of the selection icon; and transmitting the coordinates specified by the third user input to one of the server systems in order to access information associated with the address.

4. A method according to claim 3, further comprising the steps of:

scaling the image map down in size before causing the image map to be displayed, to format the image map for the display device; and scaling the coordinates specified by the third user input up before transmitting the coordinates.

5. In a client system in communication with at least one remote server system over a network the client system including a processor and a memory and coupled to a display device, a method of allowing a user to navigate through an interactive display environment including World-Wide Web (WWW) content the method comprising:

receiving information corresponding to an image map from one of the remote server systems, wherein the image map corresponds to at least one hypertext object having a uniform resource locator (URL) that is stored in one of the remote server systems and not in the client system;

causing the image map to be displayed on the display device;

selecting the image map in response to a first user input, displaying a selection icon on the display device in response to the image map being selected according to the first user input;

receiving a second user input entered from the remote input device specifying a movement of the selection icon;

receiving a third user input entered from the remote input device specifying coordinates within the image map, the coordinates corresponding to a current position of the selection icon; and transmitting the coordinates specified by the third user input to one of the server systems in order to access information associated with the URL.

6. A method according to claim 5, further comprising the steps of:

scaling the image map down in size before causing the image map to be displayed to conform the image map to the display device; and scaling the coordinates specified by the third user input up before transmitting the coordinates.

7. A program storage device readable by a machine, the program storage device tangibly embodying a program of instructions executable by the machine to perform method steps for helping a user to navigate through an interactive display environment including a plurality of hypertext objects. The method steps comprising:

causing an image of a keyboard to be displayed on the display device, the image including a plurality of soft buttons representing alphanumeric characters;

receiving a first user input from the remote input device, the first user input specifying one of the alphanumeric characters, the first user input further specifying a direction of movement of a selection indicator among the soft buttons; and recognizing one of the alphanumeric characters in response to the first user input.

8. A program storage device readable by a machine. The program storage device tangibly embodying a program of instructions executable by the machine to perform method steps for helping a user to navigate through an interactive display environment including a plurality of hypertext objects. The method steps comprising:

receiving information corresponding to an image map from one of the at least one server systems. The image map including at least one of hypertext object. Each hypertext objects included within the image map having a uniform resource locator (URL) stored within the client system, causing the image map to be displayed on the display device;

identifying the hypertext objects included within the image map;

determining one of the hypertext objects within the image map to be a selected hypertext object based on a first user input entered from a remote input device; and identifying the selected hypertext object within the image map by displaying a selection indicator.

9. A program storage device according to claim 8, the method steps further comprising the steps of:

receiving a second user input directed to the selected hypertext object;

transmitting the URL of the selected hypertext object to one of the server systems;

receiving information associated with the URL of the selected hypertext object in response to the step of transmitting; and causing the received information to be displayed on the display device.

10. A program storage device readable by a machine. The program storage device tangibly embodying a program of instructions executable be the machine to perform method steps for helping a user to navigate through an interactive display environment including a plurality of hypertext objects. The method steps comprising;

receiving information corresponding to an image map from one of the at least one server systems. The image map corresponding to at least one hypertext object having a uniform resource locator (URL) that is stored in one of the server systems and not in the client system, causing the image map to be displayed on the display device, receiving a first user input that selects the image map;

displaying a selection icon on the display device in response to the image map being selected according to the first user input;

receiving a second user input entered from the remote input device specifying a movement of the selection icon;

receiving a third user input entered from the remote input device specifying coordinates within the image map, the coordinates corresponding to a current position of the selection icon; and transmitting the coordinates specified by the third user input to one of the server systems in order to access information associated with the URL.

11. A program storage device according to claim 10, the method steps further comprising the steps of:

scaling the image map down in size before causing the image map to be displayed to conform the image map to the display device; and scaling the coordinates specified by the third user input up before transmitting the coordinates.

* * * * *

UNITED STATES PATENT AND TRADEMARK OFFICE
CERTIFICATE OF CORRECTION

PATENT NO. : 6,034,689  
DATED : March 7, 2000  
INVENTOR(S) : Christopher M. White; Phillip Y. Goldman; David R. Anderson; Keith R. Ohlfs; Bruce A. Leak It is certified that error appears in the above-identified patent and that said Letters Patent is hereby corrected as shown below:

Title page,
ABSTRACT
Line 14, after "either" change "clientside" to -- client-side --

Column 4,
Line 60, before "eg.," change "see," to -- (see, --

Column 10,
Line 10, change "selectable$_{13}$ I" to -- selectable _I --
Line 11, change "selectable$_{13}$ I" to -- selectable _I --
Line 17, change "selectable$_{13}$ I" to -- selectable _I --
Line 18, change "selectable$_{13}$ I" to -- selectable _I --
Line 24, change "selectable$_{13}$ I" to -- selectable _I --
Line 25, change "selectable$_{13}$ I" to -- selectable _I --
Line 27, change "selectable$_{13}$ I" to -- selectable _I --
Line 29, change "selectable$_{13}$ I" to -- selectable _I --
Line 30, change "selectable$_{13}$ I" to -- selectable _I --
Line 38, change "selectable$_{13}$ I" to -- selectable _I --
Line 39, change "selectable$_{13}$ I" to -- selectable _I --
Line 41, change "selectable$_{13}$ I" to -- selectable _I --
Line 42, change "selectable$_{13}$ I" to -- selectable _I --
Line 47, change "selectable$_{13}$ I" to -- selectable _I --
Line 48, change "selectable$_{13}$ I" to -- selectable _I --
Line 49, change "selectable$_{13}$ I" to -- selectable _I --
Line 53, before "(step 710) change "selectable $_{13}$I" to -- selectable _ I --
Line 53, after "if" change "selectable$_{13}$I" to -- selectable_I --
Line 57, change "selectable$_{13}$I" to -- selectable_I --
Line 59, change "selectable$_{13}$ I" to -- selectable _I --
Line 62, change "selectable$_{13}$ I" to -- selectable _I --
Line 64, change "selectable$_{13}$ I" to -- selectable _I --
Line 65, change "selectable$_{13}$ I" to -- selectable _I --
Line 67, change "selectable$_{13}$ I" to -- selectable _I --

UNITED STATES PATENT AND TRADEMARK OFFICE
CERTIFICATE OF CORRECTION

PATENT NO. : 6,034,689
DATED : March 7, 2000
INVENTOR(S) : Christopher M. White; Phillip Y. Goldman; David R. Anderson; Keith R. Ohlfs; Bruce A. Leak It is certified that error appears in the above-identified patent and that said Letters Patent is hereby corrected as shown below:

Column 11,
Line 3, change "selectable$_{13}$I" to -- selectable_I --
Line 9, change "selectable$_{13}$ I" to -- selectable _I --
Line 11, change "selectable$_{13}$I" to -- selectable _I --
Line 12, change "selectable$_{13}$I" to -- selectable _I --
Line 14, change "selectable$_{13}$ I" to -- selectable _I --
Lines 22-23, change "selectable$_{13}$I" to -- selectable_I --
Line 25, change "selectable$_{13}$I" to -- selectable_I --
Line 28, change "selectable$_{13}$I" to -- selectable _I --
Line 35, change "selectable$_{13}$ I" to -- selectable _I --
Line 37, change "selectable$_{13}$ I" to -- selectable _I --

Column 13,
Line 31, change "selectable$_{13}$I" to -- selectable_I --
Line 32, change "selectable$_{13}$I" to -- selectable_I --
Line 34, change "selectable$_{13}$ I" to -- selectable _I --
Line 35, change "selectable$_{13}$I" to -- selectable_I --

Column 14,
Line 44, after "buttons" change "15-18to -- to -- 15-18 to --

Signed and Sealed this

Twentieth Day of November, 2001

*Attest:*

NICHOLAS P. GODICI
*Attesting Officer*     Acting Director of the United States Patent and Trademark Office